US012427971B2

(12) United States Patent
Suyama et al.

(10) Patent No.: US 12,427,971 B2
(45) Date of Patent: Sep. 30, 2025

(54) VEHICLE DRIVE DEVICE

(71) Applicant: AISIN CORPORATION, Aichi (JP)

(72) Inventors: Daiki Suyama, Kariya (JP); Takuyo Maeda, Kariya (JP); Shohei Tokoro, Kariya (JP); Kohei Sasai, Kariya (JP)

(73) Assignee: AISIN CORPORATION, Kariya (JP)

( * ) Notice: Subject to any disclaimer, the term of this patent is extended or adjusted under 35 U.S.C. 154(b) by 300 days.

(21) Appl. No.: 18/029,457

(22) PCT Filed: Dec. 3, 2021

(86) PCT No.: PCT/JP2021/044531
§ 371 (c)(1),
(2) Date: Mar. 30, 2023

(87) PCT Pub. No.: WO2022/131030
PCT Pub. Date: Jun. 23, 2022

(65) Prior Publication Data
US 2023/0365122 A1 Nov. 16, 2023

(30) Foreign Application Priority Data

Dec. 15, 2020 (JP) .................. 2020-207675

(51) Int. Cl.
*B60W 20/30* (2016.01)
*B60W 10/06* (2006.01)
(Continued)

(52) U.S. Cl.
CPC ............ *B60W 20/30* (2013.01); *B60W 10/06* (2013.01); *B60W 10/08* (2013.01); *B60W 10/11* (2013.01);
(Continued)

(58) Field of Classification Search
CPC ...... B60W 20/30; B60W 20/13; B60W 10/06; B60W 10/08; B60W 10/11; B60W 10/12;
(Continued)

(56) References Cited

U.S. PATENT DOCUMENTS 5,846,155 A 12/1998 Taniguchi et al.
6,549,840 B1 4/2003 Mikami et al.
(Continued)

FOREIGN PATENT DOCUMENTS

EP 2 746 083 A1 6/2014
JP H11-332021 A 11/1999
(Continued)

OTHER PUBLICATIONS

Jan. 25, 2022 International Search Report issued in International Patent Application No. PCT/JP2021/0044531.
Mar. 13, 2024 Extended Search Report issued in European Patent Application No. 21906393.0.

*Primary Examiner* — Andrea C Leggett
(74) *Attorney, Agent, or Firm* — Oliff PLC

(57) ABSTRACT

A vehicle speed is lower than a first threshold, a control device controls both a first drive unit and a second drive unit to output a requested driving force by setting an operation mode of the first drive unit to a first mode when the requested driving force is smaller than a second threshold and the charge level of a power storage device is equal to or higher than a third threshold, and controls both the first drive unit and the second drive unit to output the requested driving force by setting the operation mode of the first drive unit to a second mode when the requested driving force is equal to or larger than the second threshold or the charge level of the power storage device is lower than the third threshold.

20 Claims, 6 Drawing Sheets

(51) Int. Cl.
*B60W 10/08* (2006.01)
*B60W 10/11* (2012.01)
*B60W 10/12* (2012.01)
*B60W 10/26* (2006.01)
*B60W 20/13* (2016.01)

(52) U.S. Cl.
CPC ............ *B60W 10/12* (2013.01); *B60W 10/26* (2013.01); *B60W 20/13* (2016.01); *B60W 2710/0666* (2013.01); *B60W 2710/083* (2013.01); *B60W 2710/1005* (2013.01)

(58) Field of Classification Search
CPC ......... B60W 10/26; B60W 2710/0666; B60W 2710/083; B60W 2710/1005
See application file for complete search history.

(56) References Cited

U.S. PATENT DOCUMENTS

| 2009/0308145 | A1* | 12/2009 | Suzuki | F02D 41/2451 |
| | | | | 180/65.28 |
| 2011/0111919 | A1* | 5/2011 | Wenthen | B60K 6/365 |
| | | | | 477/2 |
| 2018/0236861 | A1* | 8/2018 | Jegebris | F16H 3/46 |

FOREIGN PATENT DOCUMENTS

| JP | 2001-158254 A | 6/2001 |
| JP | 2003-319508 A | 11/2003 |
| JP | 2005-059851 A | 3/2005 |
| JP | 2010-095051 A | 4/2010 |

* cited by examiner

|  | CL1 | CL2 | CL3 |
|---|---|---|---|
| eTC MODE | ○ | × | Lo |
| FIRST EV MODE | × | ○ | Lo |
| SECOND EV MODE | × | ○ | Hi |
| FIRST HV MODE | ○ | ○ | Lo |
| SECOND HV MODE | ○ | ○ | Hi |
| CHARGING MODE | ○ | ○ | N |

VEHICLE DRIVE DEVICE

TECHNICAL FIELD

The present disclosure relates to a vehicle drive device including a first drive unit that drives one of front wheels and rear wheels and a second drive unit that drives the other.

BACKGROUND ART

An example of such a vehicle drive device is disclosed in Patent Document 1 below. In the description of "BACKGROUND ART" and "Problem to be Solved by the Invention", signs used in Patent Document 1 are shown in parentheses.

The vehicle drive device of Patent Document 1 includes an input member drivingly connected to an internal combustion engine (14) of a vehicle, a first output member drivingly connected to front wheels (66, 68), a first drive unit (10) including a first rotary electric machine (16) and a distribution differential gear mechanism (18), a second output member drivingly connected to rear wheels (80, 82), and a second drive unit (12) that includes a second rotary electric machine (70) and drives the rear wheels (80, 82).

The vehicle drive device of Patent Document 1 is configured to switch operation modes depending on the state of the vehicle. For example, when the vehicle travels at a constant speed, a motor traveling mode is selected to transfer a driving force of only the first rotary electric machine (16) to the front wheels (66, 68) out of the internal combustion engine (14) and the first rotary electric machine (16). When the vehicle starts moving, a torque amplification mode is selected to amplify a driving force of the internal combustion engine (14) by using the driving force of the first rotary electric machine (16) as a reaction force and transfer the amplified driving force to the front wheels (66, 68).

RELATED ART DOCUMENTS

Patent Documents

Patent Document 1: Japanese Unexamined Patent Application Publication No. 2005-59851 (JP 2005-59851 A)

SUMMARY OF THE DISCLOSURE

Problem to be Solved by the Invention

In the vehicle drive device of Patent Document 1, the driving force of only the first drive unit (10) is basically used and the driving force of the second drive unit (12) in addition to the first drive unit (10) is used only in limited situations such as a starting state and an accelerating state. Therefore, the driving force of the first drive unit (10) is basically larger than the driving force of the second drive unit (12). Thus, even if the driving force distribution between the front wheels (66, 68) and the rear wheels (80, 82) is changed depending on the traveling situation of the vehicle, the range of change is limited.

Depending on the type and mode of use of the vehicle, however, it is desirable to drive both the front wheels (66, 68) and the rear wheels (80, 82) in a wider range of situations, and to secure a high degree of freedom in terms of setting of the driving force distribution between the front wheels (66, 68) and the rear wheels (80, 82).

In view of this, there is a demand to realize a vehicle drive device that can appropriately set the driving force distribution between the front and rear wheels regardless of the traveling situation of the vehicle, in particular, whether the charge level of a power storage device is high or low, and can secure the traveling performance of the vehicle by distributing an appropriate driving force to the front and rear wheels as necessary.

Means for Solving the Problem

As the characteristic configuration of the vehicle drive device in view of the above, the vehicle drive device is
  a vehicle drive device configured to drive a front wheel and a rear wheel of a vehicle,
  one of the front wheel and the rear wheel being a first wheel and the other of the front wheel and the rear wheel being a second wheel,
  the vehicle drive device including:
  a first drive unit including an input member drivingly connected to an internal combustion engine of the vehicle, a first output member drivingly connected to the first wheel, a first rotary electric machine, and a distribution differential gear mechanism, and configured to drive the first wheel;
  a second drive unit including a second output member drivingly connected to the second wheel, and a second rotary electric machine, and configured to drive the second wheel; and
  a control device configured to control the first drive unit, the second drive unit, and the internal combustion engine, in which
  the first rotary electric machine and the second rotary electric machine are electrically connected to a power storage device so as to transmit and receive electric power to and from the power storage device,
  the distribution differential gear mechanism includes a first rotation element drivingly connected to the input member, a second rotation element drivingly connected to the first output member, and a third rotation element drivingly connected to the first rotary electric machine,
  the first drive unit has a first mode and a second mode as operation modes, in the first mode, a driving force of the first rotary electric machine is transferred to the first output member while power transfer between the internal combustion engine and the first output member is interrupted,
  in the second mode, a reaction force of a driving force transferred from the internal combustion engine to the first rotation element is transferred from the first rotary electric machine to the third rotation element to transfer a driving force of the internal combustion engine to the first output member via the second rotation element, and
  the control device is configured to:
  in a case where a speed of the vehicle is lower than a predefined first threshold,
  when a requested driving force that is a driving force requested in the vehicle is smaller than a predefined second threshold and a charge level of the power storage device is equal to or higher than a predefined third threshold, execute first control for controlling both the first drive unit and the second drive unit to output the requested driving force by setting the operation mode of the first drive unit to the first mode and transferring a driving force of the second rotary electric machine to the second output member; and
  when the requested driving force is equal to or larger than the second threshold or the charge level of the power storage device is lower than the third threshold, execute second control for controlling both the first drive unit and the second drive unit to output the requested driving force by setting the operation mode of the first drive unit to the second mode and transferring the driving force of the second rotary electric machine to the second output member.

According to this characteristic configuration, when the speed of the vehicle is relatively low, the requested driving force is relatively small, and the charge level of the power storage device is relatively high, the operation mode of the first drive unit is set to the first mode in which the driving force of the first rotary electric machine is transferred to the first output member while the power transfer between the internal combustion engine and the first output member is interrupted, and the driving force of the second rotary electric machine is transferred to the second output member. When the requested driving force is relatively large or the charge level of the power storage device is relatively low, the operation mode of the first drive unit is set to the second mode in which the driving force of the internal combustion engine is transferred to the first output member via the second rotation element by transferring, from the first rotary electric machine to the third rotation element, the reaction force of the driving force transferred from the internal combustion engine to the first rotation element, and the driving force of the second rotary electric machine is transferred to the second output member. Therefore, while the vehicle is traveling at a relatively low speed, the first wheel and the second wheel can be driven regardless of whether the charge level of the power storage device is high or low. Thus, it is possible to appropriately set the driving force distribution between the first wheel and the second wheel, and to secure the traveling performance of the vehicle by distributing an appropriate driving force to the first wheel and the second wheel as necessary. Since the requested driving force is output by both the first drive unit and the second drive unit, it is possible to secure the traveling performance of the vehicle while avoiding an increase in the size of only one of the first drive unit and the second drive unit. When the requested driving force is large, the first wheel can be driven by using the driving force of the internal combustion engine in addition to the first rotary electric machine. Thus, a large driving force can be secured.

MODES FOR CARRYING OUT THE DISCLOSURE

Figure 1:
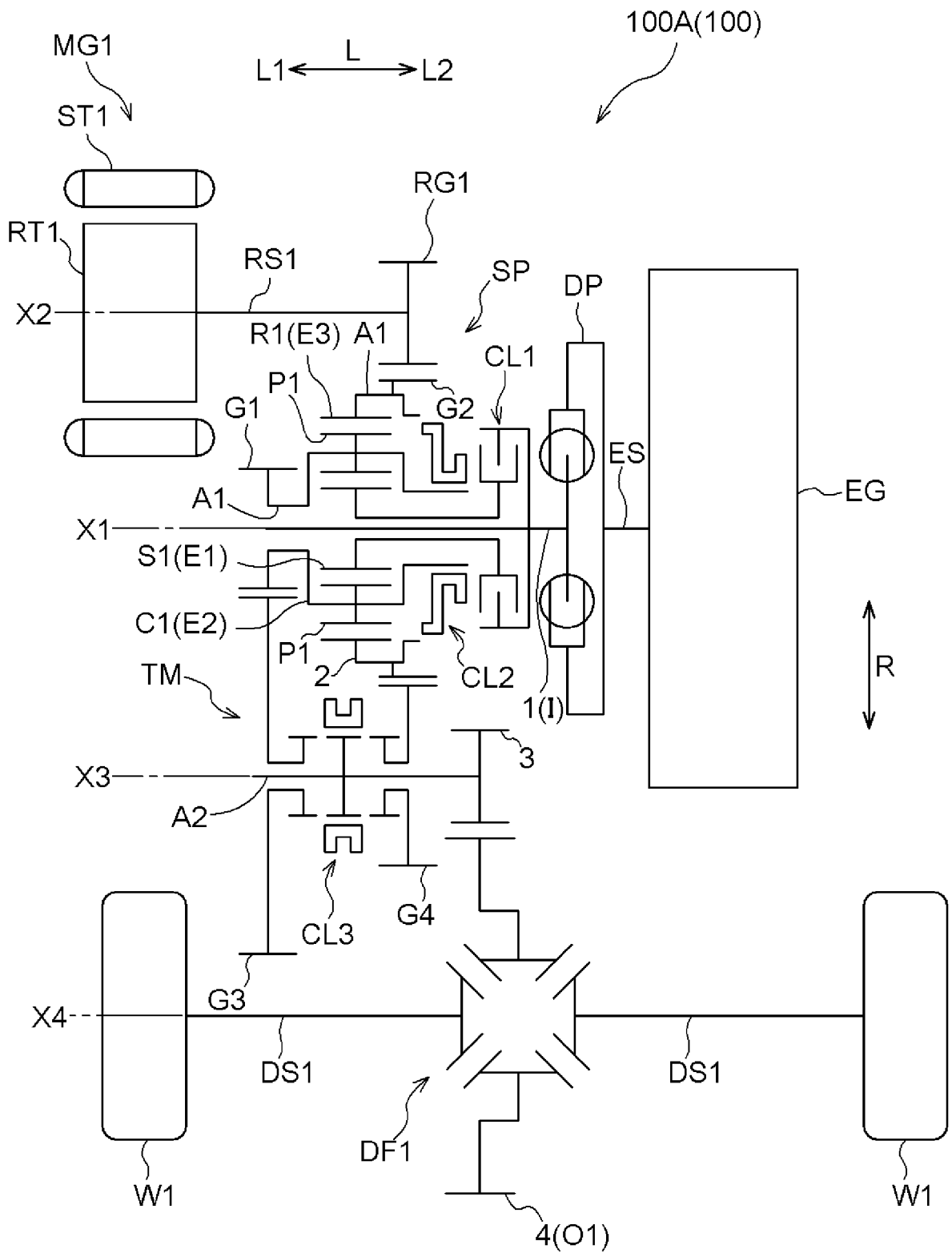
FIG. 1 is a skeleton diagram of a first drive unit of a vehicle drive device according to an embodiment.
Figure 2:
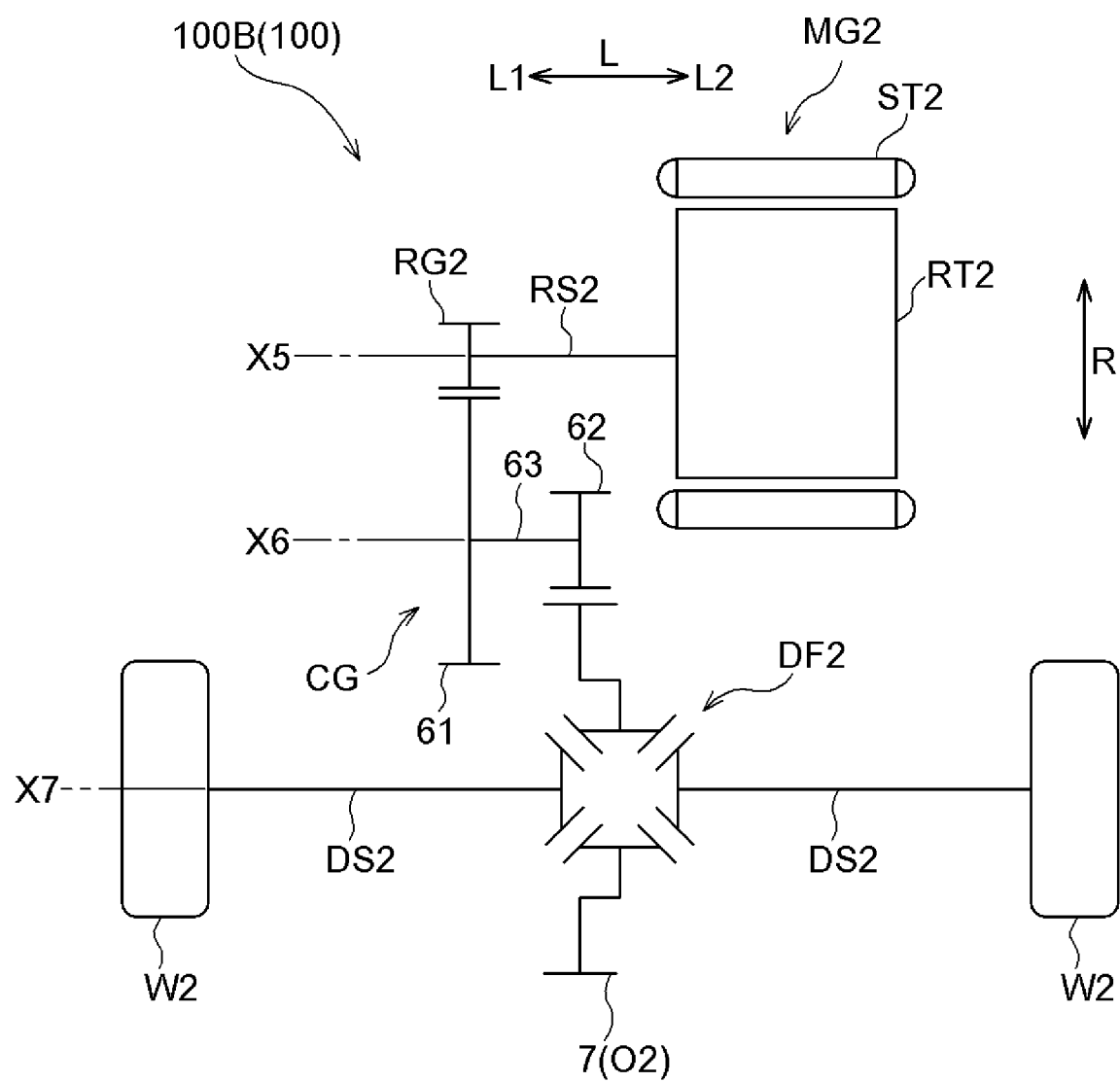
FIG. 2 is a skeleton diagram of a second drive unit of the vehicle drive device according to the embodiment.

Hereinafter, a vehicle drive device 100 according to an embodiment will be described with reference to the drawings. As shown in FIGS. 1 and 2, the vehicle drive device 100 includes a first drive unit 100A that drives first wheels W1, and a second drive unit 100B that drives second wheels W2. In the present embodiment, the first wheels W1 are front wheels of a vehicle, and the second wheels W2 are rear wheels of the vehicle.

The first drive unit 100A includes an input member I drivingly connected to an internal combustion engine EG of the vehicle, a first output member O1 drivingly connected to the first wheels W1, a first rotary electric machine MG1, and a distribution differential gear mechanism SP. In the present embodiment, the first drive unit 100A further includes a transmission TM including a first engagement device CL1, a second engagement device CL2, and a third engagement device CL3, and a first output differential gear mechanism DF1.

In the present application, "drivingly connected" refers to a state in which two rotation elements are connected so that a driving force can be transferred, and includes a state in which the two rotation elements are connected so as to rotate integrally or a state in which the two rotation elements are connected so as to be able to transfer a driving force via one, two, or more transfer members. Such transfer members include various members that transfer rotation at the same speed or at a shifted speed, such as a shaft, a gear mechanism, a belt, and a chain. The transfer members may include an engagement device that selectively transfers rotation and driving force, such as a friction engagement device and an intermeshing engagement device.

In the present embodiment, the input member I, the distribution differential gear mechanism SP, the first engagement device CL1, and the second engagement device CL2 are disposed on a first axis X1 serving as their rotation axes. The first rotary electric machine MG1 is disposed on a second axis X2 serving as its rotation axis. The third engagement device CL3 is disposed on a third axis X3 serving as its rotation axis. The first output member O1 and the first output differential gear mechanism DF1 are disposed on a fourth axis X4 serving as their rotation axes.

As shown in FIG. 2, the second drive unit 100B includes a second output member O2 drivingly connected to the second wheels W2, and a second rotary electric machine MG2. In the present embodiment, the second drive unit 100B further includes a counter gear mechanism CG and a second output differential gear mechanism DF2.

In the present embodiment, the second rotary electric machine MG2 is disposed on a fifth axis X5 serving as its rotation axis. The counter gear mechanism CG is disposed on a sixth axis X6 serving as its rotation axis. The second output member O2 and the second output differential gear mechanism DF2 are disposed on a seventh axis X7 serving as their rotation axes.

In this example, the axes X1 to X7 are parallel to each other. In the following description, a direction parallel to the axes X1 to X7 will be referred to as "axial direction L" of the vehicle drive device 100. As shown in FIG. 1, in the axial direction L, a side where the input member I is disposed with respect to the internal combustion engine EG will be referred to as "first axial side L1", and the opposite side will be referred to as "second axial side L2". A direction orthogonal to the axes X1 to X7 will be referred to as "radial direction R" with respect to each axis. When it is not necessary to distinguish the axis to be used as a reference, or when the axis to be used as a reference is clear, the direction may be simply referred to as "radial direction R".

In the present embodiment, the input member I is an input shaft 1 extending along the axial direction L. The input shaft 1 is drivingly connected to an output shaft ES of the internal combustion engine EG via a damper device DP that damps fluctuation in transferred torque. The internal combustion engine EG is a motor (gasoline engine, diesel engine, or the like) that is driven by combustion of fuel to take out driving force. In the present embodiment, the internal combustion engine EG functions as a driving force source for the first wheels W1.

The first rotary electric machine MG1 functions as a driving force source for the first wheels W1. The first rotary electric machine MG1 has a function as a motor (electric motor) that receives supply of electric power to generate driving force, and a function as a generator (electric power generator) that receives supply of driving force to generate electric power. Specifically, the first rotary electric machine MG1 is electrically connected to a power storage device BT such as a battery or a capacitor (see FIG. 3) so as to transmit and receive electric power to and from the power storage device BT. The first rotary electric machine MG1 generates a driving force by power running with electric power stored in the power storage device BT. The first rotary electric machine MG1 generates electric power with a driving force of the internal combustion engine EG or a driving force transferred from the first output member O1 side to charge the power storage device BT.

The first rotary electric machine MG1 includes a first stator ST1 and a first rotor RT1. The first stator ST1 is fixed to a non-rotating member (for example, a case that houses the first rotary electric machine MG1 and the like). The first rotor RT1 is supported so as to be rotatable relative to the first stator ST1. In the present embodiment, the first rotor RT1 is disposed on an inner side in the radial direction R with respect to the first stator ST1.

In the present embodiment, a first rotor gear RG1 is connected to the first rotor RT1 via a first rotor shaft RS1 extending along the axial direction L so as to rotate integrally with the first rotor RT1. In the present embodiment, the first rotor gear RG1 is disposed on the second axis X2. In the example shown in FIG. 1, the first rotor gear RG1 is disposed on the second axial side L2 of the first rotor RT1.

The distribution differential gear mechanism SP includes a first rotation element E1 drivingly connected to the input member I, a second rotation element E2 drivingly connected to the first output member O1, and a third rotation element E3 drivingly connected to the first rotary electric machine MG1.

In the present embodiment, the distribution differential gear mechanism SP is a planetary gear mechanism including a sun gear S1, a carrier C1, and a ring gear R1. In this example, the distribution differential gear mechanism SP is a single-pinion planetary gear mechanism including the carrier C1 that supports pinion gears P1, the sun gear S1 that meshes with the pinion gears P1, and the ring gear R1 that is disposed on an outer side in the radial direction R with respect to the sun gear S1 and meshes with the pinion gears P1.

In the present embodiment, the order of rotation speeds of the rotation elements of the distribution differential gear mechanism SP is the order of the first rotation element E1, the second rotation element E2, and the third rotation element E3. Therefore, in the present embodiment, the first rotation element E1 is the sun gear S1. The second rotation element E2 is the carrier C1. The third rotation element E3 is the ring gear R1. The "order of rotation speeds" means the order of rotation speeds of the rotation elements in a rotating state. The rotation speeds of the rotation elements change depending on the rotating state of the planetary gear mechanism, but the order of the rotation speeds of the rotation elements is constant because it is determined by the structure of the planetary gear mechanism.

The transmission TM is disposed in a power transfer path between the distribution differential gear mechanism SP and the first output member O1. The transmission TM is configured to switch a plurality of shift speeds. In the present embodiment, at least one speed ratio of the plurality of shift speeds in the transmission TM is smaller than 1.

In the present embodiment, the transmission TM is structured as a parallel-shaft gear transmission. Therefore, in the present embodiment, the transmission TM includes a first shaft member A1 and a second shaft member A2 disposed parallel to each other, a first gear G1 and a second gear G2 disposed on the first shaft member A1, a third gear G3 disposed on the second shaft member A2 and meshing with the first gear G1, and a fourth gear G4 disposed on the second shaft member A2 and meshing with the second gear G2.

In the present embodiment, the first shaft member A1, the first gear G1, and the second gear G2 are disposed on the first axis X1. In the present embodiment, the first shaft member A1 is a tubular member that rotates integrally with the second rotation element E2 (carrier C1) of the distribution differential gear mechanism SP and is also a tubular member that rotates integrally with the third rotation element E3 (ring gear R1) of the distribution differential gear mechanism SP. When the second engagement device CL2 is engaged, the first gear G1 and the second gear G2 rotate integrally with the first shaft member A1.

In the present embodiment, the first gear G1 is the first gear G1 is connected to the second rotation element E2 (carrier C1) of the distribution differential gear mechanism SP so as to rotate integrally with the second rotation element E2. In the example shown in FIG. 1, the first gear G1 is disposed on the first axial side L1 of the distribution differential gear mechanism SP.

In the present embodiment, the second gear G2 is connected to the third rotation element E3 (ring gear R1) of the distribution differential gear mechanism SP so as to rotate integrally with the third rotation element E3. The second gear G2 also meshes with the first rotor gear RG1 in addition to the fourth gear G4. In the example shown in FIG. 1, the second gear G2 is disposed at a position on an outer side in the radial direction R with respect to the ring gear R1 to overlap the distribution differential gear mechanism SP in a radial view along the radial direction R. Regarding the disposition of two elements, the phrase "overlap when viewed in a specific direction" means that, when a virtual straight line parallel to the line-of-sight direction is moved in directions orthogonal to the virtual straight line, an area where the virtual straight line intersects both the two elements is present at least in part.

In the present embodiment, the second shaft member A2, the third gear G3, and the fourth gear G4 are disposed on the third axis X3. In the present embodiment, the third gear G3 and the fourth gear G4 are supported so as to rotate relative to the second shaft member A2. The second shaft member A2 is connected to a shifting output gear 3 that is an output element of the transmission TM so as to rotate integrally with the shifting output gear 3.

The number of teeth of the first gear G1 and the number of teeth of the second gear G2 are different from each other. That is, the outside diameter of the first gear G1 and the outside diameter of the second gear G2 are different from each other. As described above, the first gear G1 and the second gear G2 are disposed coaxially, and the third gear G3 meshing with the first gear G1 and the fourth gear G4 meshing with the second gear G2 are disposed coaxially. Therefore, when the outside diameter of the first gear G1 is smaller than the outside diameter of the second gear G2, the outside diameter of the third gear G3 is larger than the outside diameter of the fourth gear G4. When the outside diameter of the first gear G1 is larger than the outside diameter of the second gear G2, the outside diameter of the third gear G3 is smaller than the outside diameter of the fourth gear G4. Therefore, the gear ratio of the third gear G3 to the first gear G1 and the gear ratio of the fourth gear G4 to the second gear G2 are different from each other. In the present embodiment, the outside diameter of the first gear G1 is smaller than the outside diameter of the second gear G2, and the number of teeth of the first gear G1 is smaller than the number of teeth of the second gear G2. Therefore, in the present embodiment, the outside diameter of the third gear G3 is larger than the outside diameter of the fourth gear G4, and the number of teeth of the third gear G3 is larger than the number of teeth of the fourth gear G4. Thus, in the present embodiment, the gear ratio of the third gear G3 to the first gear G1 is larger than the gear ratio of the fourth gear G4 to the second gear G2.

In the present embodiment, the third engagement device CL3 is an intermeshing engagement device (dog clutch) that selectively switches a state in which the driving force transferred between the first gear G1 and the third gear G3 is transferred to the second shaft member A2 and a state in which the driving force transferred between the second gear G2 and the fourth gear G4 is transferred to the second shaft member A2. In the example shown in FIG. 1, the third engagement device CL3 is configured to connect the third gear G3 or the fourth gear G4 to the second shaft member A2.

As described above, in the present embodiment, the gear ratio of the third gear G3 to the first gear G1 is larger than the gear ratio of the fourth gear G4 to the second gear G2. Therefore, when the driving force transferred between the first gear G1 and the third gear G3 is transferred to the second shaft member A2 in the third engagement device CL3, a first shift speed (low speed) having a relatively large speed ratio is formed. When the driving force transferred between the second gear G2 and the fourth gear G4 is transferred to the second shaft member A2, a second shift speed (high speed) having a relatively small speed ratio is formed. In this example, the speed ratio of the second shift speed (high speed) is smaller than 1.

In the present embodiment, the third engagement device CL3 is switchable to a neutral state in which neither of the shift speeds is formed. When the third engagement device CL3 is in the neutral state, the transmission TM does not transfer the rotation transferred from the distribution differential gear mechanism SP to the first output member O1, that is, the driving forces of the internal combustion engine EG and the first rotary electric machine MG1 are not transferred to the first wheels W1.

As described above, in the present embodiment, the first drive unit 100A further includes the transmission TM disposed in the power transfer path between the distribution differential gear mechanism SP and the first output member O1 and configured to switch the plurality of shift speeds.

The transmission TM includes the first shaft member A1 and the second shaft member A2 disposed parallel to each other, the first gear G1 and the second gear G2 disposed on the first shaft member A1, the third gear G3 disposed on the second shaft member A2 and meshing with the first gear G1, the fourth gear G4 disposed on the second shaft member A2 and meshing with the second gear G2, and the third engagement device CL3.

The third engagement device CL3 is the intermeshing engagement device that selectively switches the state in which the driving force transferred between the first gear G1 and the third gear G3 is transferred to the second shaft member A2 and the state in which the driving force transferred between the second gear G2 and the fourth gear G4 is transferred to the second shaft member A2.

According to this configuration, the transmission TM is structured as the parallel-shaft gear transmission, and the third engagement device CL3 for switching the shift speeds of the transmission TM is structured as the intermeshing engagement device. Thus, it is easy to suppress a decrease in the transfer efficiency of the driving force via the transmission TM.

The first output differential gear mechanism DF1 is configured to distribute the rotation of the first output member O1 to the pair of first wheels W1. In the present embodiment, the first output member O1 is a first differential input gear 4 that meshes with the shifting output gear 3.

In the present embodiment, the first output differential gear mechanism DF1 is a bevel gear type differential gear mechanism. Specifically, the first output differential gear mechanism DF1 includes a hollow first differential case, a first pinion shaft supported so as to rotate integrally with the first differential case, a pair of first pinion gears rotatably supported on the first pinion shaft, and a pair of first side gears meshing with the pair of first pinion gears and functioning as distribution output elements. The first differential case houses the first pinion shaft, the pair of first pinion gears, and the pair of first side gears.

In the present embodiment, the first differential input gear 4 serving as the first output member O1 is connected to the first differential case so as to protrude outward in the radial direction R from the first differential case. First drive shafts DS1 drivingly connected to the first wheels W1 are connected to the pair of first side gears so as to rotate integrally with the first side gears. Thus, in the present embodiment, the first output differential gear mechanism DF1 distributes the rotation of the first output member O1 (first differential input gear 4) to the pair of first wheels W1 via the pair of first drive shafts DS1.

The first engagement device CL1 is an engagement device that connects or disconnects power transfer between the input member I and the first rotation element E1 of the distribution differential gear mechanism SP. In the present embodiment, the first engagement device CL1 is configured to connect or disconnect power transfer between the input member I and the sun gear S1. In the example shown in FIG. 1, the first engagement device CL1 is disposed on the second axial side L2 of the distribution differential gear mechanism SP. In this example, the first engagement device CL1 is a friction engagement device that includes a pair of friction members whose engagement state is controlled by hydraulic pressure. Therefore, the transfer torque capacity of the first engagement device CL1 can be controlled by bringing the first engagement device CL1 into a slipping engagement state. Thus, when the internal combustion engine EG is started by using the driving force of the first rotary electric machine MG1, the torque transferred from the first rotary electric machine MG1 to the internal combustion engine EG can be controlled, thereby eliminating the need to temporarily stop the first rotary electric machine MG1. The "slipping engagement state" is an engagement state with a rotation speed difference (slippage) between the pair of friction members of the friction engagement device.

The second engagement device CL2 is an engagement device that connects or disconnects power transfer between two elements selected from among the three rotation elements that are the first rotation element E1, the second rotation element E2, and the third rotation element E3 in the distribution differential gear mechanism SP. In the present embodiment, the second engagement device CL2 is configured to connect or disconnect power transfer between the carrier C1 serving as the second rotation element E2 and the ring gear R1 serving as the third rotation element E3. In the example shown in FIG. 1, the second engagement device CL2 is disposed between the first engagement device CL1 and the distribution differential gear mechanism SP in the axial direction L. In this example, the second engagement device CL2 is an intermeshing engagement device (dog clutch) switchable between an engaged state and a disengaged state by an actuator such as a solenoid, an electric motor, or a hydraulic cylinder.

As shown in FIG. 2, the second rotary electric machine MG2 functions as a driving force source for the second wheels W2. The second rotary electric machine MG2 has a function as a motor (electric motor) that receives supply of electric power to generate driving force, and a function as a generator (electric power generator) that receives supply of driving force to generate electric power. Specifically, the second rotary electric machine MG2 is electrically connected to the power storage device BT (see FIG. 3) so as to transmit and receive electric power to and from the power storage device BT. The second rotary electric machine MG2 generates a driving force by power running with electric power stored in the power storage device BT. During regeneration, the second rotary electric machine MG2 generates electric power with a driving force transferred from the second output member O2 side to charge the power storage device BT.

The second rotary electric machine MG2 includes a second stator ST2 and a second rotor RT2. The second stator ST2 is fixed to a non-rotating member (for example, a case that houses the second rotary electric machine MG2 and the like). The second rotor RT2 is supported so as to be rotatable relative to the second stator ST2. In the present embodiment, the second rotor RT2 is disposed on an inner side in the radial direction R with respect to the second stator ST2.

In the present embodiment, a second rotor gear RG2 is connected to the second rotor RT2 via a second rotor shaft RS2 extending along the axial direction L so as to rotate integrally with the second rotor RT2. In the present embodiment, the second rotor gear RG2 is disposed on the fifth axis X5. In the example shown in FIG. 2, the second rotor gear RG2 is disposed on the first axial side L1 of the second rotor RT2.

The counter gear mechanism CG includes a counter input gear 61, a counter output gear 62, and a counter shaft 63 connecting these gears 61 and 62 so as to rotate integrally.

The counter input gear 61 is an input element of the counter gear mechanism CG. In the present embodiment, the counter input gear 61 meshes with the second rotor gear RG2. The counter output gear 62 is an output element of the counter gear mechanism CG. In the example shown in FIG. 2, the counter output gear 62 is disposed on the second axial side L2 of the counter input gear 61. The counter output gear 62 is formed to have a smaller diameter than the counter input gear 61.

The second output differential gear mechanism DF2 is configured to distribute the rotation of the second output member O2 to the pair of second wheels W2. In the present embodiment, the second output member O2 is a second differential input gear 7 that meshes with the counter output gear 62 of the counter gear mechanism CG.

In the present embodiment, the second output differential gear mechanism DF2 is a bevel gear type differential gear mechanism. Specifically, the second output differential gear mechanism DF2 includes a hollow second differential case, a second pinion shaft supported so as to rotate integrally with the second differential case, a pair of second pinion gears rotatably supported on the second pinion shaft, and a pair of second side gears meshing with the pair of second pinion gears and functioning as distribution output elements. The second differential case houses the second pinion shaft, the pair of second pinion gears, and the pair of second side gears.

In the present embodiment, the second differential input gear 7 serving as the second output member O2 is connected to the second differential case so as to protrude outward in the radial direction R from the second differential case. Second drive shafts DS2 drivingly connected to the second wheels W2 are connected to the pair of second side gears so as to rotate integrally with the second side gears. Thus, in the present embodiment, the second output differential gear mechanism DF2 distributes the rotation of the second output member O2 (second differential input gear 7) to the pair of second wheels W2 via the pair of second drive shafts DS2.

Figure 3:
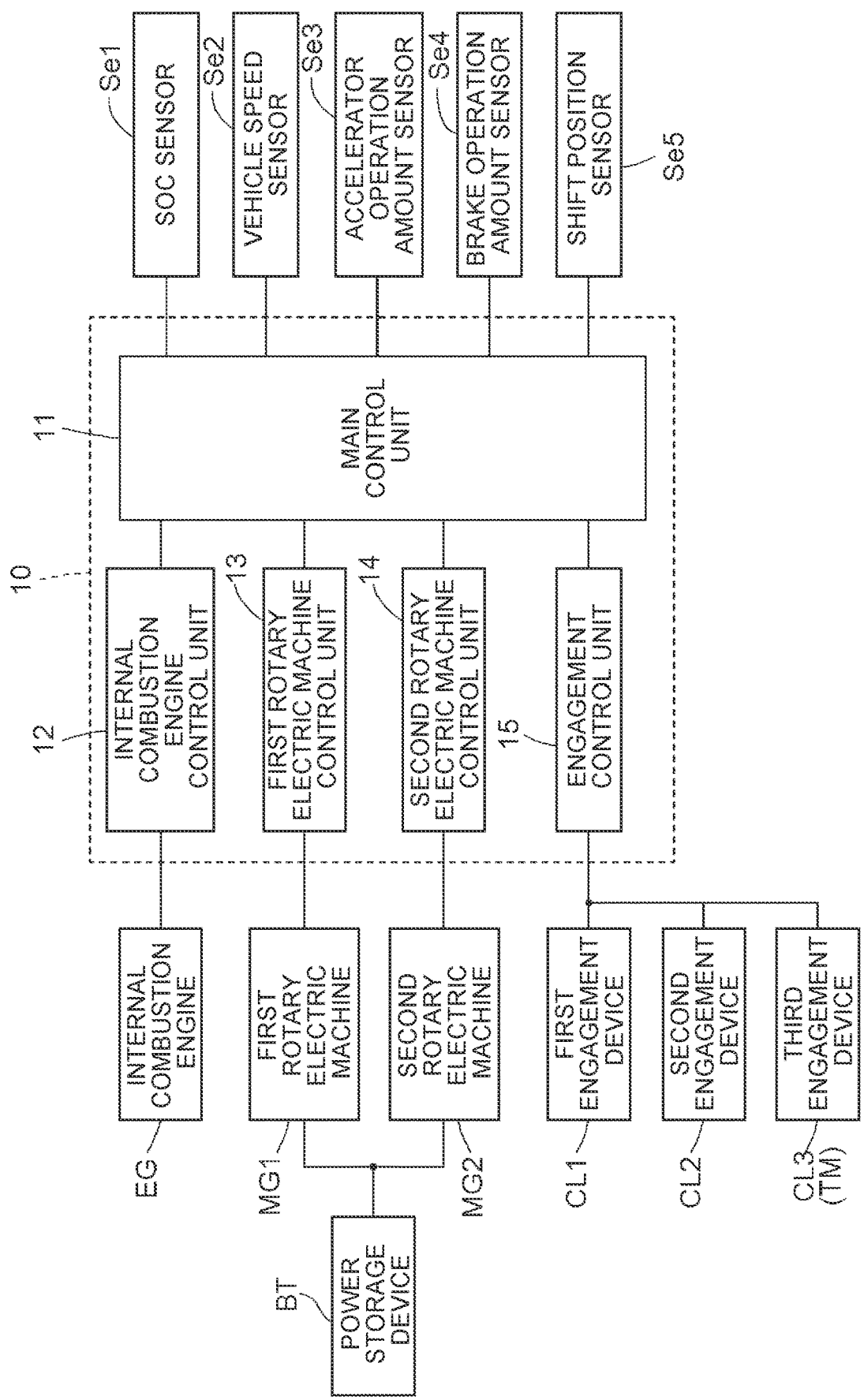
FIG. 3 is a control block diagram of the vehicle drive device according to the embodiment.

As shown in FIG. 3, the vehicle drive device 100 includes a control device that controls the first drive unit 100A, the second drive unit 100B, and the internal combustion engine EG. In the present embodiment, the control device 10 includes a main control unit 11, an internal combustion engine control unit 12 that controls the internal combustion engine EG, a first rotary electric machine control unit 13 that controls the first rotary electric machine MG1, a second rotary electric machine control unit 14 that controls the second rotary electric machine MG2, and an engagement control unit 15 that controls the engagement states of the first engagement device CL1, the second engagement device CL2, and the third engagement device CL3.

The main control unit 11 outputs, to the internal combustion engine control unit 12, the first rotary electric machine control unit 13, the second rotary electric machine control unit 14, and the engagement control unit 15, commands to control devices handled by the respective control units. The internal combustion engine control unit 12 controls the internal combustion engine EG so that the internal combustion engine EG outputs a target torque commanded by the main control unit 11 or a target rotation speed commanded by the main control unit 11 is achieved. The first rotary electric machine control unit 13 controls the first rotary electric machine MG1 so that the first rotary electric machine MG1 outputs a target torque commanded by the main control unit 11 or a target rotation speed commanded by the main control unit 11 is achieved. The second rotary electric machine control unit 14 controls the second rotary electric machine MG2 so that the second rotary electric machine MG2 outputs a target torque commanded by the main control unit 11 or a target rotation speed commanded by the main control unit 11 is achieved. The engagement control unit 15 controls actuators (not shown) for operating the first engagement device CL1, the second engagement device CL2, and the third engagement device CL3 so that the first engagement device CL1, the second engagement device CL2, and the third engagement device CL3 come into engagement states commanded by the main control unit 11.

The main control unit 11 is configured to acquire pieces of information from sensors provided in individual parts of the vehicle including the vehicle drive device 100 in order to acquire pieces of information on the individual parts of the vehicle. In the present embodiment, the main control unit 11 is configured to acquire pieces of information from an SOC sensor Se1, a vehicle speed sensor Se2, an accelerator operation amount sensor Se3, a brake operation amount sensor Se4, and a shift position sensor Se5.

The SOC sensor Se1 is a sensor for detecting the state of the power storage device BT electrically connected to the first rotary electric machine MG1 and the second rotary electric machine MG2. The SOC sensor Se1 includes, for example, a voltage sensor and a current sensor. The main control unit 11 calculates a charge level (SOC: state of charge) of the power storage device BT based on information such as a voltage value and a current value output from the SOC sensor Se1.

The vehicle speed sensor Se2 is a sensor for detecting a vehicle speed V that is a traveling speed of the vehicle including the vehicle drive device 100. In the present embodiment, the vehicle speed sensor Se2 is a sensor for detecting a rotation speed of the first output member O1. The main control unit 11 calculates a rotation speed (angular velocity) of the first output member O1 based on information on the rotation speed that is output from the vehicle speed sensor Se2. Since the rotation speed of the first output member O1 is proportional to the vehicle speed V, the main control unit 11 calculates the vehicle speed V based on a detection signal from the vehicle speed sensor Se2.

The accelerator operation amount sensor Se3 is a sensor for detecting an amount of driver's operation on an accelerator pedal provided in the vehicle including the vehicle drive device 100. The main control unit 11 calculates the amount of driver's operation on the accelerator pedal based on a detection signal from the accelerator operation amount sensor Se3.

The brake operation amount sensor Se4 is a sensor for detecting an amount of driver's operation on a brake pedal provided in the vehicle including the vehicle drive device 100. The main control unit 11 calculates the amount of driver's operation on the brake pedal based on a detection signal from the brake operation amount sensor Se4.

The shift position sensor Se5 is a sensor for detecting a selected position (shift position) of a shift lever operated by the driver of the vehicle including the vehicle drive device 100. The main control unit 11 calculates the shift position based on a detection signal from the shift position sensor Se5. The shift lever is configured such that a parking range (P range), a reverse travel range (R range), a neutral range (N range), a forward travel range (D range), and the like are selectable.

The main control unit 11 selects a plurality of operation modes of the first drive unit 100A described later based on the pieces of information from the sensors Se1 to Se5. The main control unit 11 controls the first engagement device CL1, the second engagement device CL2, and the third engagement device CL3 via the engagement control unit 15 to come into engagement states associated with the selected operation mode to achieve switching to the selected operation mode. The main control unit 11 cooperatively controls the operation states of the internal combustion engine EG, the first rotary electric machine MG1, and the second rotary electric machine MG2 via the internal combustion engine control unit 12, the first rotary electric machine control unit 13, and the second rotary electric machine control unit 14 to achieve appropriate travel of the vehicle based on the selected operation mode.

Figures 4, 5:
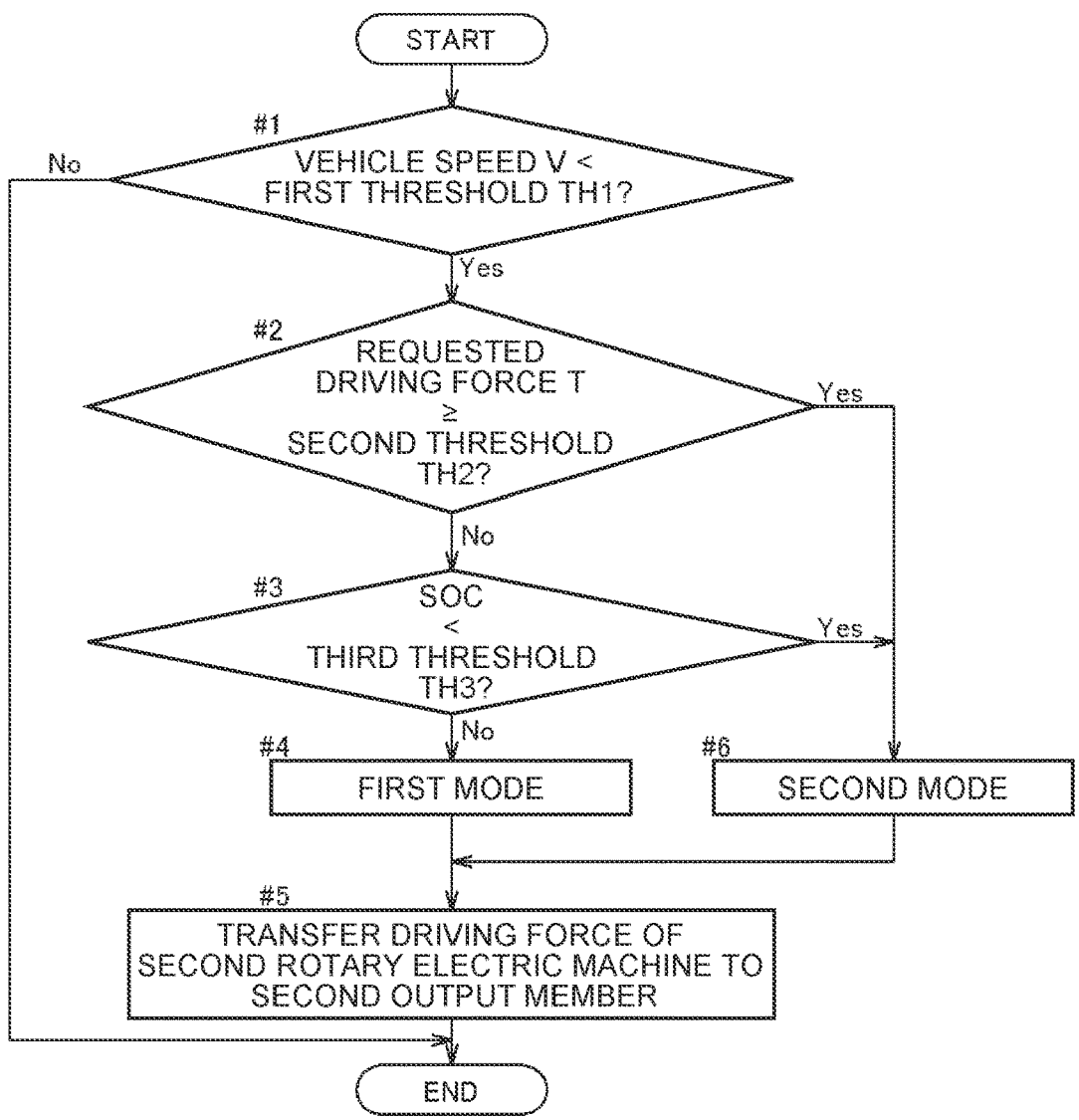
FIG. 4 is a diagram showing states of engagement devices in each operation mode of the vehicle drive device according to the embodiment.
FIG. 5 is a flowchart showing a control process to be performed by a control device while a vehicle is traveling at a relatively low speed.

As shown in FIG. 4, in the present embodiment, the first drive unit 100A has, as the operation modes, an electric torque converter mode (hereinafter referred to as "eTC mode"), a first EV mode, a second EV mode, a first HV mode, a second HV mode, and a charging mode.

FIG. 4 shows states of the first engagement device CL1, the second engagement device CL2, and the third engagement device CL3 in each operation mode of the first drive unit 100A of the present embodiment. In the fields for the first engagement device CL1 and the second engagement device CL2 in FIG. 4, "o" indicates that the target engagement device is engaged, and "x" indicates that the target engagement device is disengaged. In the fields for the third engagement device CL3 in FIG. 4, "Lo" indicates that the third engagement device CL3 forms the first shift speed (low speed), "Hi" indicates that the third engagement device CL3 forms the second shift speed (high speed), and "N" indicates that the third engagement device CL3 is neutral.

The eTC mode is a mode in which the distribution differential gear mechanism SP amplifies the torque of the internal combustion engine EG by using the torque of the first rotary electric machine MG1 as a reaction force and transfers the amplified torque to the first output member O1, thereby causing the vehicle to travel. The eTC mode is called "electric torque converter mode" because the torque of the internal combustion engine EG can be amplified and transferred to the first output member O1.

In the eTC mode of the present embodiment, the first rotary electric machine MG1 generates electric power by outputting a positive torque while rotating backward, and the distribution differential gear mechanism SP combines the driving force of the first rotary electric machine MG1 and the driving force of the internal combustion engine EG and outputs a driving force larger than the driving force of the internal combustion engine EG from the second rotation element E2 (carrier C1). The rotation of the second rotation element E2 is shifted in the transmission TM at a speed ratio corresponding to the first shift speed (low speed) and transferred to the first output member O1. Therefore, the eTC mode can be selected even when the charge level of the power storage device BT is relatively low.

As shown in FIG. 4, in the eTC mode of the present embodiment, control is performed so that the first engagement device CL1 is engaged, the second engagement device CL2 is disengaged, and the third engagement device CL3 forms the first shift speed (low speed). In this way, the eTC mode is a "second mode" in which the reaction force of the driving force transferred from the internal combustion engine EG to the first rotation element E1 is transferred from the first rotary electric machine MG1 to the third rotation element E3 to transfer the driving force of the internal combustion engine EG to the first output member O1 via the second rotation element E2.

The first EV mode is a mode in which the vehicle travels at a relatively low speed with the driving force of only the first rotary electric machine MG1 out of the internal combustion engine EG and the first rotary electric machine MG1. The second EV mode is a mode in which the vehicle travels at a relatively high speed with the driving force of only the first rotary electric machine MG1 out of the internal combustion engine EG and the first rotary electric machine MG1.

In the first EV mode of the present embodiment, control is performed so that the first engagement device CL1 is disengaged, the second engagement device CL2 is engaged, and the third engagement device CL3 forms the first shift speed (low speed). In the second EV mode of the present embodiment, control is performed so that the first engagement device CL1 is disengaged, the second engagement device CL2 is engaged, and the third engagement device CL3 forms the second shift speed (high speed).

In the first EV mode and the second EV mode of the present embodiment, the internal combustion engine EG is separated from the distribution differential gear mechanism SP by disengaging the first engagement device CL1. Therefore, the power transfer between the internal combustion engine EG and the first output member O1 is interrupted. By engaging the second engagement device CL2, the three rotation elements E1 to E3 of the distribution differential gear mechanism SP rotate integrally with each other. As a result, the rotation input from the first rotary electric machine MG1 side to the distribution differential gear mechanism SP is transferred as it is to the first gear G1 and the second gear G2 of the transmission TM. The rotation transferred to the transmission TM is shifted at the speed ratio of the first shift speed (low speed) in the first EV mode and at the speed ratio of the second shift speed (high speed) in the second EV mode depending on the state of the third engagement device CL3, and is transferred to the first output member O1.

As described above, each of the first EV mode and the second EV mode is a "first mode" in which the driving force of the first rotary electric machine MG1 is transferred to the first output member O1 while the power transfer between the internal combustion engine EG and the first output member O1 is interrupted.

The first HV mode is a mode in which the vehicle travels at a relatively low speed with the driving force of at least the internal combustion engine EG out of the internal combustion engine EG and the first rotary electric machine MG1. The second HV mode is a mode in which the vehicle travels at a relatively high speed with the driving force of at least the internal combustion engine EG out of the internal combustion engine EG and the first rotary electric machine MG1.

In the first HV mode of the present embodiment, control is performed so that both the first engagement device CL1 and the second engagement device CL2 are engaged and the third engagement device CL3 forms the first shift speed (low speed). In the second HV mode of the present embodiment, control is performed so that both the first engagement device CL1 and the second engagement device CL2 are engaged and the third engagement device CL3 forms the second shift speed (high speed).

In the first HV mode and the second HV mode of the present embodiment, the internal combustion engine EG is connected to the distribution differential gear mechanism SP by engaging the first engagement device CL1. By engaging the second engagement device CL2, the three rotation elements E1 to E3 of the distribution differential gear mechanism SP rotate integrally with each other. As a result, the rotation input from the internal combustion engine EG side and the first rotary electric machine MG1 side to the distribution differential gear mechanism SP is transferred as it is to the third gear G3 and the fourth gear G4 of the transmission TM. The rotation transferred to the transmission TM is shifted at the speed ratio of the first shift speed (low speed) in the first EV mode and at the speed ratio of the second shift speed (high speed) in the second EV mode depending on the state of the third engagement device CL3, and is transferred to the first output member O1.

As described above, each of the first HV mode and the second HV mode is a "third mode" in which the first rotation element E1, the second rotation element E2, and the third rotation element E3 of the distribution differential gear mechanism SP rotate integrally with each other and the driving force of at least the internal combustion engine EG is transferred to the first output member O1.

The charging mode is a mode in which the power storage device BT is charged by causing the first rotary electric machine MG1 to generate electric power by using the driving force of the internal combustion engine EG. In the charging mode of the present embodiment, control is performed so that the first engagement device CL1 is engaged, the second engagement device CL2 is engaged, and the third engagement device CL3 is neutral. The control is performed so that the internal combustion engine EG outputs the driving force and the first rotary electric machine MG1 outputs the driving force in a direction opposite to the rotation direction of the first rotor RT1 rotated by the driving force of the internal combustion engine EG, thereby generating electric power. In the charging mode, the vehicle may be stopped, or may travel by causing the second rotary electric machine MG2 to perform power running with electric power generated by the first rotary electric machine MG1 and transferring the driving force of the second rotary electric machine MG2 to the second wheels W2. The mode in which the vehicle travels by the driving force of the second rotary electric machine MG2 while being in the charging mode is called "series hybrid mode".

As described above, in the present embodiment, the order of the rotation speeds of the first rotation element E1, the second rotation element E2, and the third rotation element E3 of the distribution differential gear mechanism SP is the stated order.

The first drive unit 100A further includes the first engagement device CL1 that connects or disconnects power transfer between the input member I and the first rotation element E1, and the second engagement device CL2 that connects or disconnects power transfer between two elements selected from among the three rotation elements that are the first rotation element E1, the second rotation element E2, and the third rotation element E3.

In the first mode (first EV mode and second EV mode), the first engagement device CL1 is disengaged and the second engagement device CL2 is engaged.

In the second mode (eTC mode), the first engagement device CL1 is engaged and the second engagement device CL2 is disengaged.

According to this configuration, in the second mode, the driving force of the internal combustion engine EG can be amplified by using the driving force of the first rotary electric machine MG1 as a reaction force and transferred to the first output member O1.

According to this configuration, the operation mode of the first drive unit 100A can appropriately be switched by controlling the engagement states of the first engagement device CL1 and the second engagement device CL2.

In the present embodiment, the first drive unit 100A further has the third mode (first HV mode and second HV mode) as the operation mode.

In the third mode, the first rotation element E1, the second rotation element E2, and the third rotation element E3 of the distribution differential gear mechanism SP rotate integrally with each other and the driving force of at least the internal combustion engine EG is transferred to the first output member O1.

The first drive unit 100A further includes the first engagement device CL1 that connects or disconnects power transfer between the input member I and the first rotation element E1, and the second engagement device CL2 that connects or disconnects power transfer between two elements selected from among the three rotation elements that are the first rotation element E1, the second rotation element E2, and the third rotation element E3.

In the third mode, both the first engagement device CL1 and the second engagement device CL2 are engaged.

The first drive unit 100A further includes the transmission TM disposed in the power transfer path between the distribution differential gear mechanism SP and the first output member O1 and configured to switch the plurality of shift speeds.

At least one speed ratio of the plurality of shift speeds is smaller than 1.

According to this configuration, when the vehicle speed V is relatively high, the vehicle can efficiently travel by switching to the shift speed having the speed ratio smaller than 1.

A control process to be performed by the control device 10 while the vehicle is traveling at a relatively low speed will be described below with reference to FIG. 5. FIG. is a flowchart showing the control process to be performed by the control device 10 while the vehicle is traveling at the relatively low speed.

As shown in FIG. 5, the control device 10 first determines whether the vehicle speed V is lower than a predefined first threshold TH1 (Step #1). In the present embodiment, the main control unit 11 calculates the vehicle speed V based on the detection signal from the vehicle speed sensor Se2, and determines whether the vehicle speed V is lower than the first threshold TH1. In this example, the control device 10 determines, in addition to the above, whether a driving force in a forward direction of the vehicle is being transferred to the first wheels W1 and the second wheels W2.

When determination is made that the vehicle speed V is equal to or higher than the first threshold TH1 (Step #1: No), the control device 10 terminates the control process. In this case, the control device 10 executes control during normal travel or during deceleration (not shown). When determination is made that the vehicle speed V is lower than the first threshold TH1 (Step #1: Yes), the control device 10 determines whether a requested driving force T that is a driving force requested in the vehicle is equal to or larger than a predefined second threshold TH2 (Step #2). In the present embodiment, the main control unit 11 calculates the requested driving force T based on the detection signals from the accelerator operation amount sensor Se3 and the brake operation amount sensor Se4, and determines whether the requested driving force T is equal to or larger than the second threshold TH2.

When determination is made that the requested driving force T is smaller than the second threshold TH2 (Step #2: No), the control device 10 determines whether the charge level (SOC) of the power storage device BT is lower than a predefined third threshold TH3 (Step #3). In the present embodiment, the main control unit 11 calculates the charge level (SOC) of the power storage device BT based on information such as a voltage value and a current value output from the SOC sensor Se1, and determines whether the charge level is lower than the first threshold TH1. In the present embodiment, the charge level (SOC) is expressed as the ratio of the charge level (for example, 0 to 100%) at that time to the fully charged state (100%) of the power storage device BT. Therefore, the third threshold TH3 is also defined as the ratio of the charge level to the fully charged state (100%).

When determination is made that the charge level (SOC) of the power storage device BT is equal to or higher than the predefined third threshold TH3 (Step #3: No), the control device 10 executes first control for controlling both the first drive unit 100A and the second drive unit 100B to output the requested driving force T by setting the operation mode of the first drive unit 100A to the first mode (first EV mode or second EV mode) (Step #4) and transferring the driving force of the second rotary electric machine MG2 to the second output member O2 (Step #5).

When determination is made that the requested driving force T is equal to or larger than the second threshold TH2 (Step #2: Yes) or determination is made that the charge level (SOC) of the power storage device BT is lower than the third threshold TH3 (Step #3: Yes), the control device 10 executes second control for controlling both the first drive unit 100A and the second drive unit 100B to output the requested driving force T by setting the operation mode of the first drive unit 100A to the second mode (eTC mode) (Step #6) and transferring the driving force of the second rotary electric machine MG2 to the second output member O2 (Step #5).

As described above, the control device 10 is configured to:
in the case where the vehicle speed V is lower than the predefined first threshold TH1,
when the requested driving force T is smaller than the predefined second threshold TH2 and the charge level (SOC) of the power storage device BT is equal to or higher than the predefined third threshold TH3, execute the first control for controlling both the first drive unit 100A and the second drive unit 100B to output the requested driving force T by setting the operation mode of the first drive unit 100A to the first mode (first EV mode or second EV mode) and transferring the driving force of the second rotary electric machine MG2 to the second output member O2; and
when the requested driving force T is equal to or larger than the second threshold TH2 or the charge level (SOC) of the power storage device BT is lower than the third threshold TH3, execute the second control for controlling both the first drive unit 100A and the second drive unit 100B to output the requested driving force T by setting the operation mode of the first drive unit 100A to the second mode (eTC mode) and transferring the driving force of the second rotary electric machine MG2 to the second output member O2.

According to this configuration, when the vehicle speed V is relatively low, the requested driving force T is relatively small, and the charge level (SOC) of the power storage device BT is relatively high, the operation mode of the first drive unit 100A is set to the first mode (first EV mode or second EV mode) in which the driving force of the first rotary electric machine MG1 is transferred to the first output member O1 while the power transfer between the internal combustion engine EG and the first output member O1 is interrupted, and the driving force of the second rotary electric machine MG2 is transferred to the second output member O2. When the requested driving force T is relatively large or the charge level (SOC) of the power storage device BT is relatively low, the operation mode of the first drive unit 100A is set to the second mode (eTC mode) in which the driving force of the internal combustion engine EG is transferred to the first output member O1 via the second rotation element E2 by transferring, from the first rotary electric machine MG1 to the third rotation element E3, the reaction force of the driving force transferred from the internal combustion engine EG to the first rotation element E1, and the driving force of the second rotary electric machine MG2 is transferred to the second output member O2. Therefore, while the vehicle is traveling at a relatively low speed, the first wheels W1 and the second wheels W2 can be driven regardless of whether the charge level (SOC) of the power storage device BT is high or low. Thus, it is possible to appropriately set the driving force distribution between the first wheels W1 and the second wheels W2, and to secure the traveling performance of the vehicle by distributing an appropriate driving force to the first wheels W1 and the second wheels W2 as necessary. Since the requested driving force T is output by both the first drive unit 100A and the second drive unit 100B, it is possible to secure the traveling performance of the vehicle while avoiding an increase in the size of only one of the first drive unit 100A and the second drive unit 100B. When the requested driving force T is large, the first wheels W1 can be driven by using the driving force of the internal combustion engine EG in addition to the first rotary electric machine MG1. Thus, a large driving force can be secured.

Figure 6:
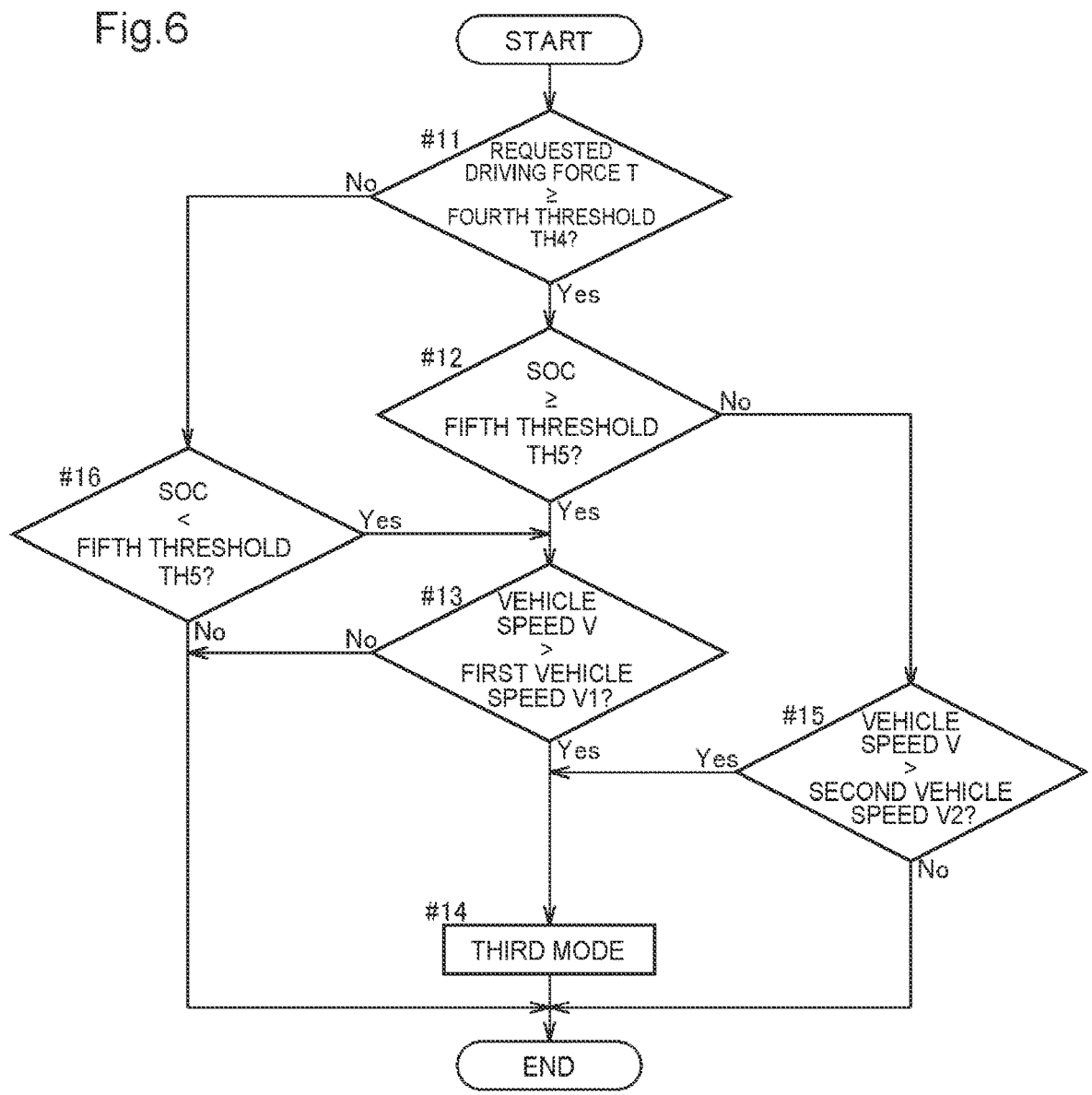
FIG. 6 is a flowchart showing a control process to be performed by the control device during execution of second control.

In the present embodiment, the control device 10 performs control shown in FIG. 6 during execution of the second control. FIG. 6 is a flowchart showing a control process to be performed by the control device 10 during the execution of the second control.

As shown in FIG. 6, in the present embodiment, the control device 10 first determines whether the requested driving force T is equal to or larger than a predefined fourth threshold TH4 during the execution of the second control (Step #11). The fourth threshold TH4 may be the same value as the second threshold TH2, or may be a different value.

When determination is made that the requested driving force T is equal to or larger than the fourth threshold TH4 (Step #11: Yes), the control device 10 determines whether the charge level (SOC) of the power storage device BT is equal to or higher than a predefined fifth threshold TH5 (Step #12). The fifth threshold TH5 may be the same value as the third threshold TH3, or may be a different value.

When determination is made that the charge level (SOC) of the power storage device BT is equal to or higher than the fifth threshold TH5 (Step #12: Yes), the control device 10 determines whether the vehicle speed V is higher than a first vehicle speed V1 (Step #13). The first vehicle speed V1 is a vehicle speed V at which the rotation speed of the internal combustion engine EG is a lower limit of an autonomously rotatable speed of the internal combustion engine EG when the operation mode of the first drive unit 100A is the third mode (first HV mode).

When determination is made that the vehicle speed V is higher than the first vehicle speed V1 (Step #13: Yes), the control device 10 switches the operation mode of the first drive unit 100A from the second mode (eTC mode) to the third mode (first HV mode) (Step #14). When determination is made that the vehicle speed V is equal to or lower than the first vehicle speed V1 (Step #13: No), the control device 10 terminates the control process.

When determination is made in Step #12 that the charge level (SOC) of the power storage device BT is lower than the fifth threshold TH5 (Step #12: No), the control device 10 determines whether the vehicle speed V is higher than a second vehicle speed V2 (Step #15). The second vehicle speed V2 is set to a value higher than the first vehicle speed V1.

When determination is made that the vehicle speed V is higher than the second vehicle speed V2 (Step #15: Yes), the control device 10 switches the operation mode of the first drive unit 100A from the second mode (eTC mode) to the third mode (first HV mode) (Step #14). When determination is made that the vehicle speed V is equal to or lower than the second vehicle speed V2 (Step #15: No), the control device 10 terminates the control process.

When determination is made in Step #11 that the requested driving force T is smaller than the fourth threshold TH4 (Step #11: No), the control device 10 determines whether the charge level (SOC) of the power storage device BT is lower than the fifth threshold TH5 (Step #16).

When determination is made that the charge level (SOC) of the power storage device BT is lower than the fifth threshold TH5 (Step #16: Yes), the control device 10 performs the control from Step #13 onward. When determination is made that the charge level (SOC) of the power storage device BT is equal to or higher than the fifth threshold TH5 (Step #16: No), the control device 10 terminates the control process.

As described above, in the present embodiment, the order of the rotation speeds of the first rotation element E1, the second rotation element E2, and the third rotation element E3 of the distribution differential gear mechanism SP is the stated order.

The first drive unit 100A further has the third mode (first HV mode and second HV mode) as the operation mode.

In the third mode, the first rotation element E1, the second rotation element E2, and the third rotation element E3 of the distribution differential gear mechanism SP rotate integrally with each other and the driving force of at least the internal combustion engine EG is transferred to the first output member O1.

The control device 10 is configured to:
during the execution of the second control,
in the case where the requested driving force T is equal to or larger than the predefined fourth threshold TH4 and the charge level (SOC) is equal to or higher than the predefined fifth threshold TH5 or in the case where the requested driving force T is smaller than the fourth threshold TH4 and the charge level (SOC) is lower than the fifth threshold TH5, switch the operation mode of the first drive unit 100A from the second mode to the third mode when the vehicle speed V exceeds the first vehicle speed V1; and
in the case where the requested driving force T is equal to or larger than the fourth threshold TH4 and the charge level (SOC) is lower than the fifth threshold TH5, switch the operation mode of the first drive unit 100A from the second mode to the third mode when the vehicle speed V exceeds the second vehicle speed V2 set to the value higher than the first vehicle speed V1.

According to this configuration, in the case where the requested driving force T is relatively large and the charge level (SOC) of the power storage device BT is relatively low, the operation mode of the first drive unit 100A is maintained as the second mode (eTC mode) in which a large driving force can easily be secured until the second vehicle speed V2 is exceeded even though the first vehicle speed V1 is exceeded while the vehicle is traveling at a relatively low speed. Thus, the vehicle can travel by securing a sufficient driving force for the wheels even when the charge level (SOC) of the power storage device BT is relatively low.

Instead of the above, the following configuration may be adopted.

That is, the order of the rotation speeds of the first rotation element E1, the second rotation element E2, and the third rotation element E3 of the distribution differential gear mechanism SP is the stated order.

The first drive unit 100A further has the third mode (first HV mode and second HV mode) as the operation mode.

In the third mode, the first rotation element E1, the second rotation element E2, and the third rotation element E3 of the distribution differential gear mechanism SP rotate integrally with each other and the driving force of at least the internal combustion engine EG is transferred to the first output member O1.

The control device 10 is configured to, during the execution of the second control, switch the operation mode of the first drive unit 100A from the second mode to the third mode when the vehicle speed V exceeds the first vehicle speed V1.

According to this configuration, when the vehicle speed V is relatively low, the operation mode of the first drive unit 100A is set to the second mode (eTC mode) in which a large driving force can easily be secured. Thus, the number of gears in the first drive unit 100A can be reduced, and furthermore, the size of the first drive unit 100A can be reduced.

When the vehicle speed V is relatively high, the operation mode of the first drive unit 100A is switched from the second mode to the third mode. Thus, when the vehicle speed V is relatively high, the vehicle can efficiently travel by using the driving force of at least the internal combustion engine EG.

Figure 7:
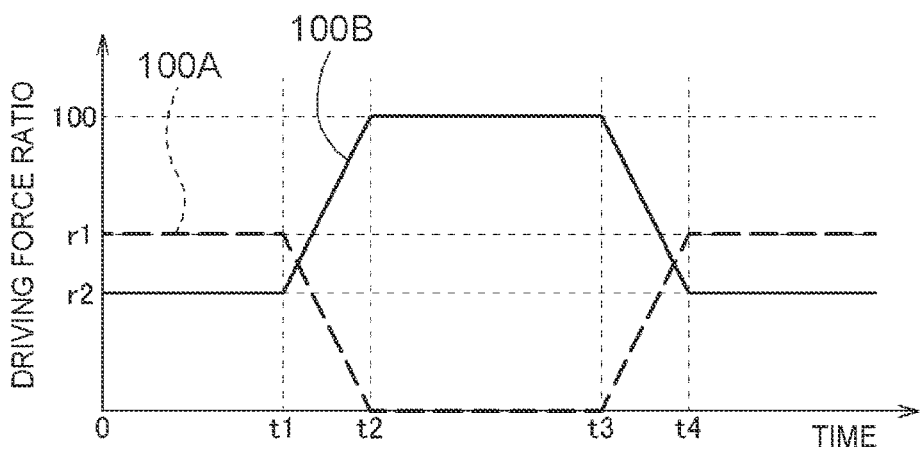
FIG. 7 is a time chart showing an example of changes in driving force ratios of the first drive unit and the second drive unit.

A control process when the control device 10 switches the operation mode of the first drive unit 100A in a specific pattern will be described below with reference to FIG. 7. FIG. 7 is a time chart showing changes in driving force ratios of the first drive unit 100A and the second drive unit 100B.

As shown in FIG. 7, in the present embodiment, when performing mode switching for the operation mode of the first drive unit 100A from the second mode to the third mode, the control device 10 controls the driving force of the second drive unit 100B so as to compensate for a fluctuation in the driving force of the first drive unit 100A caused by the mode switching. More specifically, the control device 10 controls the second drive unit 100B to output a driving force corresponding to a decrease in the driving force of the first drive unit 100A caused by the mode switching. In this example, the control device 10 performs such control when switching the operation mode of the first drive unit 100A from the eTC mode to the first HV mode.

In the present embodiment, before the transmission TM performs an operation of switching the shift speeds, the control device 10 reduces the driving force output to the first output member O1 in the first drive unit 100A and increases the driving force output to the second output member O2 in the second drive unit 100B. After the transmission TM completes the operation of switching the shift speeds, the control device 10 increases the driving force output to the first output member O1 in the first drive unit 100A and reduces the driving force output to the second output member O2 in the second drive unit 100B. In this example, the control device 10 performs such control when switching the operation mode of the first drive unit 100A from the first EV mode to the second EV mode or from the first HV mode to the second HV mode.

In the example shown in FIG. 7, when a command to switch the operation mode as described above is issued in a case where the vehicle is traveling in a state in which the driving force ratio of the first drive unit 100A is r1 and the driving force ratio of the second drive unit 100B is r2, the control device 10 reduces the driving force ratio of the first drive unit 100A from r1 to zero and increases the driving force ratio of the second drive unit 100B from r2 to 100 in a period from t1 to t2. In a period from t2 to t3, the control device 10 performs the operation mode switching process as described above. When the operation mode switching process is completed, the control device 10 increases the driving force ratio of the first drive unit 100A from zero to r1 and reduces the driving force ratio of the second drive unit 100B from 100 to r2 in a period from t3 to t4. The driving force ratio is the ratio of the driving force of the corresponding drive unit to the total driving force of the first drive unit 100A and the second drive unit 100B. In the example shown in FIG. 7, r1 is larger than r2 (r1>r2).

As described above, in the present embodiment, the first drive unit 100A further has the third mode as the operation mode.

In the third mode, the first rotation element E1, the second rotation element E2, and the third rotation element E3 of the distribution differential gear mechanism SP rotate integrally with each other and the driving force of at least the internal combustion engine EG is transferred to the first output member O1.

When performing mode switching for the operation mode of the first drive unit 100A from the second mode (eTC mode) to the third mode (first HV mode), the control device 10 controls the driving force of the second drive unit 100B so as to compensate for a fluctuation in the driving force of the first drive unit 100A caused by the mode switching.

According to this configuration, when performing the mode switching for the operation mode of the first drive unit 100A from the second mode to the third mode, the fluctuation in the driving force of the entire vehicle caused by the mode switching can be suppressed.

In the present embodiment, the first drive unit 100A further includes the transmission TM disposed in the power transfer path between the distribution differential gear mechanism SP and the first output member O1 and configured to switch the plurality of shift speeds.

The control device 10 is configured to:
before the transmission TM performs an operation of switching the shift speeds, reduce the driving force output to the first output member O1 in the first drive unit 100A and increase the driving force output to the second output member O2 in the second drive unit 100B; and
after the transmission TM completes the operation of switching the shift speeds, increase the driving force output to the first output member O1 in the first drive unit 100A and reduce the driving force output to the second output member O2 in the second drive unit 100B.

According to this configuration, the driving force of the first drive unit 100A is reduced before the transmission TM performs the operation of switching the shift speeds, and the driving force of the first drive unit 100A is increased after the transmission TM completes the operation of switching the shift speeds. Thus, it is possible to suppress the fluctuation in the driving force of the first drive unit 100A caused by the operation of switching the shift speeds.

According to this configuration, the driving force of the second drive unit 100B is increased before the transmission TM performs the operation of switching the shift speeds, and the driving force of the second drive unit 100B is reduced after the transmission TM completes the operation of switching the shift speeds. Thus, the driving force of the second drive unit 100B can compensate for the fluctuation in the driving force of the first drive unit 100A during the operation of switching the shift speeds.

Figure 8:
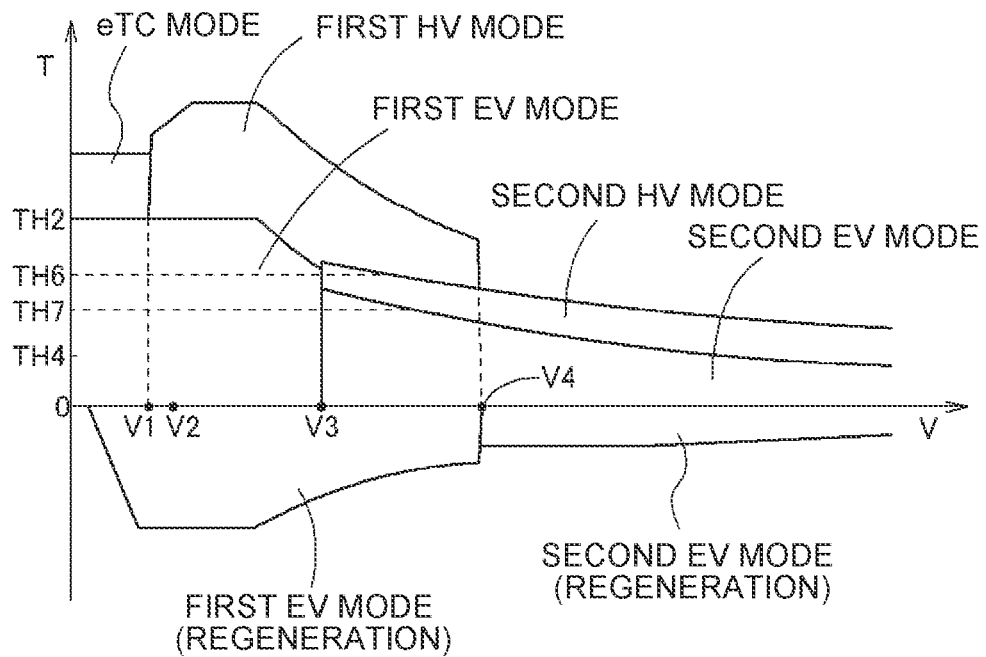
FIG. 8 is a diagram showing an example of a control map for determining an operation mode of the first drive unit when the charge level of the power storage device is relatively high.
Figure 9:
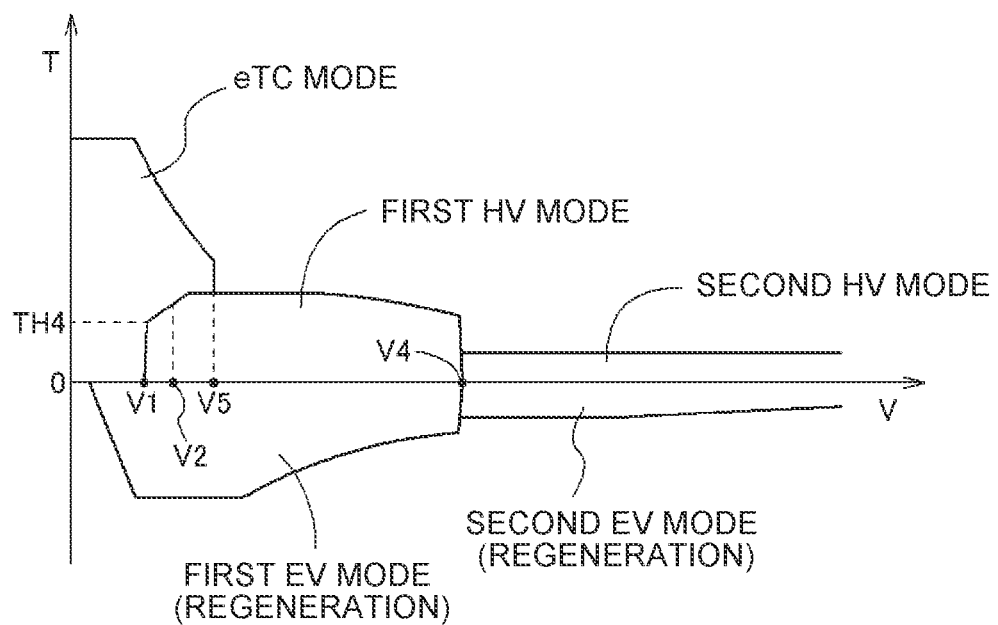
FIG. 9 is a diagram showing an example of a control map for determining the operation mode of the first drive unit when the charge level of the power storage device is relatively low.

FIGS. 8 and 9 show examples of control maps to be referred to for determining the operation mode of the first drive unit 100A based on the vehicle speed V and the requested driving force T. FIG. 8 shows a control map when the charge level (SOC) of the power storage device BT is relatively high. FIG. 9 shows a control map when the charge level (SOC) of the power storage device BT is relatively low. In this example, the third threshold TH3 and the fifth threshold TH5 are set to the same value. When the charge level (SOC) of the power storage device BT is equal to or higher than the third threshold TH3 (fifth threshold TH5), the control map shown in FIG. 8 is referred to. When the charge level (SOC) of the power storage device BT is lower than the third threshold TH3 (fifth threshold TH5), the control map shown in FIG. 9 is referred to.

In the example shown in FIG. 8, in a case where the vehicle speed V is higher than zero and equal to or lower than the first vehicle speed V1, the eTC mode is selected when the requested driving force T is equal to or larger than the second threshold TH2, and the first EV mode is selected when the requested driving force T is larger than zero and smaller than the second threshold TH2.

In a case where the vehicle speed V is higher than the first vehicle speed V1 and equal to or lower than a third vehicle speed V3 higher than the second vehicle speed V2, the first HV mode is selected when the requested driving force T is equal to or larger than the second threshold TH2, and the first EV mode is selected when the requested driving force T is larger than zero and smaller than the second threshold TH2.

In a case where the vehicle speed V is higher than the third vehicle speed V3 and equal to or lower than a fourth vehicle speed V4 higher than the third vehicle speed V3, the first HV mode is selected when the requested driving force T is equal to or larger than a sixth threshold TH6 smaller than the second threshold TH2, the second HV mode is selected when the requested driving force T is smaller than the sixth threshold TH6 and equal to or larger than a seventh threshold TH7 smaller than the sixth threshold TH6, and the second EV mode is selected when the requested driving force T is larger than zero and smaller than the seventh threshold TH7. In the illustrated example, the sixth threshold TH6 and the seventh threshold TH7 are set to values that gradually decrease as the vehicle speed V increases.

In a case where the vehicle speed V is higher than the fourth vehicle speed V4, the second HV mode is selected when the requested driving force T is equal to or larger than the seventh threshold TH7, and the second EV mode is selected when the requested driving force T is smaller than the seventh threshold TH7.

In a case where the requested driving force T is smaller than zero, that is, the vehicle is decelerated, the first EV mode is selected when the vehicle speed V is higher than zero and equal to or lower than the fourth vehicle speed V4, and the second EV mode is selected when the vehicle speed V is higher than the fourth vehicle speed V4.

When the vehicle travels steadily or is accelerated and the operation mode of the first drive unit 100A is set to the first EV mode or the second EV mode by referring to the control map shown in FIG. 8, the internal combustion engine EG is stopped and both the first rotary electric machine MG1 and the second rotary electric machine MG2 perform power running. Similarly, when the operation mode of the first drive unit 100A is set to the first HV mode or the second HV mode, both the internal combustion engine EG and the first rotary electric machine MG1 are driven and the second rotary electric machine MG2 performs power running. When the vehicle is decelerated and the operation mode of the first drive unit 100A is set to the first EV mode or the second EV mode by referring to the control map shown in FIG. 8, the internal combustion engine EG is stopped and both the first rotary electric machine MG1 and the second rotary electric machine MG2 perform regeneration.

In the example shown in FIG. 9, the eTC mode is selected when the vehicle speed V is higher than zero and equal to or lower than the first vehicle speed V1. In a case where the vehicle speed V is a value higher than the first vehicle speed V1 and equal to or lower than a fifth vehicle speed V5 higher than the second vehicle speed V2 and lower than the fourth vehicle speed V4, the eTC mode is selected when the requested driving force T is equal to or larger than the fourth threshold TH4, and the first HV mode is selected when the requested driving force T is larger than zero and smaller than the fourth threshold TH4. The first HV mode is selected when the vehicle speed V is higher than the fifth vehicle speed V5 and equal to or lower than the fourth vehicle speed V4. The second HV mode is selected when the vehicle speed V is higher than the fourth vehicle speed V4. In the illustrated example, the fourth threshold TH4 is set to a value that gradually increases as the vehicle speed V increases in a range equal to or lower than a specified vehicle speed lower than the fifth vehicle speed V5.

In a case where the requested driving force T is smaller than zero, that is, the vehicle is decelerated, the first EV mode is selected when the vehicle speed V is higher than zero and equal to or lower than the fourth vehicle speed V4, and the second EV mode is selected when the vehicle speed V is higher than the fourth vehicle speed V4.

When the vehicle travels steadily or is accelerated and the operation mode of the first drive unit 100A is set to the first HV mode or the second HV mode by referring to the control map shown in FIG. 9, the internal combustion engine EG is driven and both the first rotary electric machine MG1 and the second rotary electric machine MG2 are stopped. When the vehicle is decelerated and the operation mode of the first drive unit 100A is set to the first EV mode or the second EV mode by referring to the control map shown in FIG. 9, the internal combustion engine EG is stopped and both the first rotary electric machine MG1 and the second rotary electric machine MG2 perform regeneration.

Other Embodiments (1) In the above embodiment, description has been given of the exemplary configuration in which the operation mode (first mode) of the vehicle drive device 100 that is realized by engaging the first engagement device CL1 and disengaging the second engagement device CL2 is the electric torque converter mode (eTC mode). However, the present disclosure is not limited to such a configuration. For example, the distribution differential gear mechanism SP may be configured to realize a so-called split hybrid mode by engaging the first engagement device CL1 and disengaging the second engagement device CL2. The split hybrid mode is a mode in which the driving force of the internal combustion engine EG is distributed to the first rotary electric machine MG1 side and the first output member O1 side (transmission TM side) and a driving force damped relative to the driving force of the internal combustion engine EG by using the driving force of the first rotary electric machine MG1 as a reaction force is transferred to the first output member O1 side. In this case, the order of the rotation speeds of the rotation elements of the distribution differential gear mechanism SP may be set to the order of the second rotation element E2, the first rotation element E1, and the third rotation element E3. For example, when the distribution differential gear mechanism SP is structured by a single-pinion planetary gear mechanism, the sun gear may be drivingly connected to the first rotor RT1 as the third rotation element E3, the carrier may be drivingly connected to the input member I as the first rotation element E1, and the ring gear may be used as the second rotation element E2 to serve as the output element of the distribution differential gear mechanism SP. In this mode, the first rotary electric machine MG1 generates electric power by outputting a negative torque while rotating forward, and the distribution differential gear mechanism SP outputs the driving force of the internal combustion engine EG from the second rotation element E2 by using the driving force of the first rotary electric machine MG1 as a reaction force. The rotation of the second rotation element E2 is transferred to the first output member O1 via the transmission TM.

(2) In the above embodiment, description has been given of the exemplary configuration in which, when switching the operation mode of the first drive unit 100A in a specific pattern, the control device 10 reduces the driving force ratio of the first drive unit 100A from r1 to zero and increases the driving force ratio of the second drive unit 100B from r2 to 100 before the operation mode is switched. However, the present disclosure is not limited to such a configuration. For example, the driving force ratio of the first drive unit 100A may be reduced from r1 to a value larger than zero and the driving force ratio of the second drive unit 100B may be increased from r2 to a value smaller than 100 before the operation mode is switched.

(3) In the above embodiment, description has been given of the exemplary configuration in which the transmission TM is the parallel-shaft gear transmission, and the third engagement device CL3 for switching the shift speeds of the transmission TM is the intermeshing engagement device. However, the present disclosure is not limited to such a configuration. The transmission TM may be, for example, a planetary gear transmission. The third engagement device CL3 may be a friction engagement device.

(4) In the above embodiment, description has been given of the exemplary configuration in which at least one speed ratio of the plurality of shift speeds in the transmission TM is smaller than 1. However, the present disclosure is not limited to such a configuration. The speed ratios of all the shift speeds in the transmission TM may be equal to or larger than 1.

(5) In the above embodiment, description has been given of the exemplary case where the distribution differential gear mechanism SP is the single-pinion planetary gear mechanism. However, the present disclosure is not limited to such a configuration. For example, the distribution differential gear mechanism SP may be structured by a double-pinion planetary gear mechanism. Alternatively, the distribution differential gear mechanism SP may be structured by any other differential gear device in, for example, a configuration in which a plurality of bevel gears is combined.

(6) In the above embodiment, description has been given of the exemplary configuration in which the first engagement device CL1 is the friction engagement device and the second engagement device CL2 is the intermeshing engagement device. However, the present disclosure is not limited to such a configuration. For example, the first engagement device CL1 may be an intermeshing engagement device and the second engagement device CL2 may be a friction engagement device.

(7) The configurations disclosed in the above embodiments can be applied in combination with the configurations disclosed in other embodiments as long as there is no contradiction. Regarding the other configurations, the embodiments disclosed herein are merely illustrative in all respects. Therefore, various modifications can be made as appropriate without departing from the spirit of the present disclosure.

Outline of Embodiment Described Above

Hereinafter, the outline of the vehicle drive device (100) described above will be described.

The vehicle drive device (100) is a vehicle drive device (100) configured to drive a front wheel and a rear wheel of a vehicle, one of the front wheel and the rear wheel being a first wheel (W1) and the other of the front wheel and the rear wheel being a second wheel (W2), the vehicle drive device (100) including:

a first drive unit (100A) including an input member (I) drivingly connected to an internal combustion engine (EG) of the vehicle, a first output member (O1) drivingly connected to the first wheel (W1), a first rotary electric machine (MG1), and a distribution differential gear mechanism (SP), and configured to drive the first wheel (W1);

a second drive unit (100B) including a second output member (O2) drivingly connected to the second wheel (W2), and a second rotary electric machine (MG2), and configured to drive the second wheel (W2); and a control device (10) configured to control the first drive unit (100A), the second drive unit (100B), and the internal combustion engine (EG), in which the first rotary electric machine (MG1) and the second rotary electric machine (MG2) are electrically connected to a power storage device (BT) so as to transmit and receive electric power to and from the power storage device (BT), the distribution differential gear mechanism (SP) includes a first rotation element (E1) drivingly connected to the input member (I), a second rotation element (E2) drivingly connected to the first output member (O1), and a third rotation element (E3) drivingly connected to the first rotary electric machine (MG1), the first drive unit (100A) has a first mode and a second mode as operation modes, in the first mode, a driving force of the first rotary electric machine (MG1) is transferred to the first output member (O1) while power transfer between the internal combustion engine (EG) and the first output member (O1) is interrupted, in the second mode, a reaction force of a driving force transferred from the internal combustion engine (EG) to the first rotation element (E1) is transferred from the first rotary electric machine (MG1) to the third rotation element (E3) to transfer a driving force of the internal combustion engine (EG) to the first output member (O1) via the second rotation element (E2), and the control device (10) is configured to:
in a case where a speed (V) of the vehicle is lower than a predefined first threshold (TH1),
when a requested driving force (T) that is a driving force requested in the vehicle is smaller than a predefined second threshold (TH2) and a charge level of the power storage device (BT) is equal to or higher than a predefined third threshold (TH3), execute first control for controlling both the first drive unit (100A) and the second drive unit (100B) to output the requested driving force (T) by setting the operation mode of the first drive unit (100A) to the first mode and transferring a driving force of the second rotary electric machine (MG2) to the second output member (O2); and
when the requested driving force (T) is equal to or larger than the second threshold (TH2) or the charge level of the power storage device (BT) is lower than the third threshold (TH3), execute second control for controlling both the first drive unit (100A) and the second drive unit (100B) to output the requested driving force (T) by setting the operation mode of the first drive unit (100A) to the second mode and transferring the driving force of the second rotary electric machine (MG2) to the second output member (O2).

According to this configuration, when the speed (V) of the vehicle is relatively low, the requested driving force (T) is relatively small, and the charge level of the power storage device (BT) is relatively high, the operation mode of the first drive unit (100A) is set to the first mode in which the driving force of the first rotary electric machine (MG1) is transferred to the first output member (O1) while the power transfer between the internal combustion engine (EG) and the first output member (O1) is interrupted, and the driving force of the second rotary electric machine (MG2) is transferred to the second output member (O2). When the requested driving force (T) is relatively large or the charge level of the power storage device (BT) is relatively low, the operation mode of the first drive unit (100A) is set to the second mode in which the driving force of the internal combustion engine (EG) is transferred to the first output member (O1) via the second rotation element (E2) by transferring, from the first rotary electric machine (MG1) to the third rotation element (E3), the reaction force of the driving force transferred from the internal combustion engine (EG) to the first rotation element (E1), and the driving force of the second rotary electric machine (MG2) is transferred to the second output member (O2). Therefore, while the vehicle is traveling at a relatively low speed, the first wheel (W1) and the second wheel (W2) can be driven regardless of whether the charge level of the power storage device (BT) is high or low. Thus, it is possible to appropriately set the driving force distribution between the first wheel (W1) and the second wheel (W2), and to secure the traveling performance of the vehicle by distributing an appropriate driving force to the first wheel (W1) and the second wheel (W2) as necessary. Since the requested driving force (T) is output by both the first drive unit (100A) and the second drive unit (100B), it is possible to secure the traveling performance of the vehicle while avoiding an increase in the size of only one of the first drive unit (100A) and the second drive unit (100B). When the requested driving force (T) is large, the first wheel (W1) can be driven by using the driving force of the internal combustion engine (EG) in addition to the first rotary electric machine (MG1). Thus, a large driving force can be secured.

It is preferable that the first drive unit (100A) further have a third mode as the operation mode,
in the third mode, the first rotation element (E1), the second rotation element (E2), and the third rotation element (E3) of the distribution differential gear mechanism (SP) rotate integrally with each other and the driving force of at least the internal combustion engine (EG) be transferred to the first output member (O1), and
the control device (10) be configured to, when performing mode switching for the operation mode of the first drive unit (100A) from the second mode to the third mode, control a driving force of the second drive unit (100B) so as to compensate for a fluctuation in a driving force of the first drive unit (100A) caused by the mode switching.

According to this configuration, when performing the mode switching for the operation mode of the first drive unit (100A) from the second mode to the third mode, the fluctuation in the driving force of the entire vehicle caused by the mode switching can be suppressed.

It is preferable that the first drive unit (100A) further include a transmission (TM) disposed in a power transfer path between the distribution differential gear mechanism (SP) and the first output member (O1) and configured to switch a plurality of shift speeds, and
the control device (10) be configured to:
before the transmission (TM) performs an operation of switching the shift speeds, reduce a driving force output to the first output member (O1) in the first drive unit (100A) and increase a driving force output to the second output member (O2) in the second drive unit (100B); and
after the transmission (TM) completes the operation of switching the shift speeds, increase the driving force output to the first output member (O1) in the first drive unit (100A) and reduce the driving force output to the second output member (O2) in the second drive unit (100B).

According to this configuration, the driving force of the first drive unit (100A) is reduced before the transmission (TM) performs the operation of switching the shift speeds, and the driving force of the first drive unit (100A) is increased after the transmission (TM) completes the operation of switching the shift speeds. Thus, it is possible to suppress the fluctuation in the driving force of the first drive unit (100A) caused by the operation of switching the shift speeds.

According to this configuration, the driving force of the second drive unit (100B) is increased before the transmission (TM) performs the operation of switching the shift speeds, and the driving force of the second drive unit (100B) is reduced after the transmission (TM) completes the operation of switching the shift speeds. Thus, the driving force of the second drive unit (100B) can compensate for the fluctuation in the driving force of the first drive unit (100A) during the operation of switching the shift speeds.

It is preferable that order of rotation speeds of the first rotation element (E1), the second rotation element (E2), and the third rotation element (E3) of the distribution differential gear mechanism (SP) be the stated order,
the first drive unit (100A) further include a first engagement device (CL1) configured to connect or disconnect power transfer between the input member (I) and the first rotation element (E1), and a second engagement device (CL2) configured to connect or disconnect power transfer between two elements selected from among three rotation elements that are the first rotation element (E1), the second rotation element (E2), and the third rotation element (E3), in the first mode, the first engagement device (CL1) be disengaged and the second engagement device (CL2) be engaged, and in the second mode, the first engagement device (CL1) be engaged and the second engagement device (CL2) be disengaged.

According to this configuration, in the second mode, the driving force of the internal combustion engine (EG) can be amplified by using the driving force of the first rotary electric machine (MG1) as a reaction force and transferred to the first output member (O1).

According to this configuration, the operation mode of the first drive unit (100A) can appropriately be switched by controlling the engagement states of the first engagement device (CL1) and the second engagement device (CL2).

It is preferable that order of rotation speeds of the first rotation element (E1), the second rotation element (E2), and the third rotation element (E3) of the distribution differential gear mechanism (SP) be the stated order, the first drive unit (100A) further have a third mode as the operation mode, in the third mode, the first rotation element (E1), the second rotation element (E2), and the third rotation element (E3) of the distribution differential gear mechanism (SP) rotate integrally with each other and the driving force of at least the internal combustion engine (EG) be transferred to the first output member (O1), and assuming that a speed (V) of the vehicle at which a rotation speed of the internal combustion engine (EG) is a lower limit of an autonomously rotatable speed of the internal combustion engine (EG) when the operation mode of the first drive unit (100A) is the third mode is a first vehicle speed (V1), the control device (10) be configured to, during execution of the second control, switch the operation mode of the first drive unit (100A) from the second mode to the third mode when the speed (V) of the vehicle exceeds the first vehicle speed (V1).

According to this configuration, when the speed (V) of the vehicle is relatively low, the operation mode of the first drive unit (100A) is set to the second mode in which a large driving force can easily be secured. Thus, the number of gears in the first drive unit (100A) can be reduced, and furthermore, the size of the first drive unit (100A) can be reduced.

When the speed (V) of the vehicle is relatively high, the operation mode of the first drive unit (100A) is switched from the second mode to the third mode. Thus, when the speed (V) of the vehicle is relatively high, the vehicle can efficiently travel by using the driving force of at least the internal combustion engine (EG).

It is preferable that order of rotation speeds of the first rotation element (E1), the second rotation element (E2), and the third rotation element (E3) of the distribution differential gear mechanism (SP) be the stated order, the first drive unit (100A) further have a third mode as the operation mode, in the third mode, the first rotation element (E1), the second rotation element (E2), and the third rotation element (E3) of the distribution differential gear mechanism (SP) rotate integrally with each other and the driving force of at least the internal combustion engine (EG) be transferred to the first output member (O1), and assuming that a speed (V) of the vehicle at which a rotation speed of the internal combustion engine (EG) is a lower limit of an autonomously rotatable speed of the internal combustion engine (EG) when the operation mode of the first drive unit (100A) is the third mode is a first vehicle speed (V1), the control device (10) be configured to:

during execution of the second control, in a case where the requested driving force (T) is equal to or larger than a predefined fourth threshold (TH4) and the charge level is equal to or higher than a predefined fifth threshold (TH5) or in a case where the requested driving force (T) is smaller than the fourth threshold (TH4) and the charge level is lower than the fifth threshold (TH5), switch the operation mode of the first drive unit (100A) from the second mode to the third mode when the speed (V) of the vehicle exceeds the first vehicle speed (V1); and in a case where the requested driving force (T) is equal to or larger than the fourth threshold (TH4) and the charge level is lower than the fifth threshold (TH5), switch the operation mode of the first drive unit (100A) from the second mode to the third mode when the speed (V) of the vehicle exceeds a second vehicle speed (V2) set to a vehicle speed higher than the first vehicle speed (V1).

According to this configuration, in the case where the requested driving force (T) is relatively large and the charge level of the power storage device (BT) is relatively low, the operation mode of the first drive unit (100A) is maintained as the second mode in which a large driving force can easily be secured until the second vehicle speed (V2) is exceeded even though the first vehicle speed (V1) is exceeded while the vehicle is traveling at a relatively low speed. Thus, the vehicle can travel by securing a sufficient driving force for the wheel (W1) even when the charge level of the power storage device (BT) is relatively low.

It is preferable that the first drive unit (100A) further include a transmission (TM) disposed in a power transfer path between the distribution differential gear mechanism (SP) and the first output member (O1) and configured to switch a plurality of shift speeds, the transmission (TM) include a first shaft member (A1) and a second shaft member (A2) disposed parallel to each other, a first gear (G1) and a second gear (G2) disposed on the first shaft member (A1), a third gear (G3) disposed on the second shaft member (A2) and meshing with the first gear (G1), a fourth gear (G4) disposed on the second shaft member (A2) and meshing with the second gear, and a third engagement device (CL3), and the third engagement device (CL3) be an intermeshing engagement device configured to selectively switch a state in which a driving force transferred between the first gear (G1) and the third gear (G3) is transferred to the second shaft member (A2) and a state in which a driving force transferred between the second gear (G2) and the fourth gear (G4) is transferred to the second shaft member (A2).

According to this configuration, the transmission (TM) is structured as the parallel-shaft gear transmission, and the third engagement device (CL3) for switching the shift speeds of the transmission (TM) is structured as the intermeshing engagement device. Thus, it is easy to suppress a decrease in the transfer efficiency of the driving force via the transmission (TM).

It is preferable that the first drive unit (100A) further have a third mode as the operation mode, in the third mode, the first rotation element (E1), the second rotation element (E2), and the third rotation element (E3) of the distribution differential gear mechanism (SP) rotate integrally with each other and the driving force of at least the internal combustion engine (EG) be transferred to the first output member (O1), the first drive unit (100A) further include a first engagement device (CL1) configured to connect or disconnect power transfer between the input member (I) and the first rotation element (E1), and a second engagement device (CL2) configured to connect or disconnect power transfer between two elements selected from among three rotation elements that are the first rotation element (E1), the second rotation element (E2), and the third rotation element (E3), in the third mode, both the first engagement device (CL1) and the second engagement device (CL2) be engaged, the first drive unit (100A) further include a transmission (TM) disposed in a power transfer path between the distribution differential gear mechanism (SP) and the first output member (O1) and configured to switch a plurality of shift speeds, and at least one speed ratio of the plurality of shift speeds be smaller than 1.

According to this configuration, when the speed (V) of the vehicle is relatively high, the vehicle can efficiently travel by switching to the shift speed having the speed ratio smaller than 1.

INDUSTRIAL APPLICABILITY

The technology according to the present disclosure is applicable to a vehicle drive device including a first drive unit that drives one of front wheels and rear wheels and a second drive unit that drives the other.

DESCRIPTION OF THE REFERENCE NUMERALS

100: vehicle drive device, 100A: first drive unit, 100B: second drive unit, 10: control device, MG1: first rotary electric machine, MG2: second rotary electric machine, SP: distribution differential gear mechanism, E1: first rotation element, E2: second rotation element, E3: third rotation element, I: input member, O1: first output member, O2: second output member, BT: power storage device, EG: internal combustion engine, W1: first wheel, W2: second wheel, V: vehicle speed, T: requested driving force, TH1: first threshold, TH2: second threshold, TH3: third threshold

The invention claimed is:

1. A vehicle drive device configured to drive a front wheel and a rear wheel of a vehicle,
one of the front wheel and the rear wheel being a first wheel and the other of the front wheel and the rear wheel being a second wheel,
the vehicle drive device comprising:
a first drive unit including an input member drivingly connected to an internal combustion engine of the vehicle, a first output member drivingly connected to the first wheel, a first rotary electric machine, and a distribution differential gear mechanism, and configured to drive the first wheel;
a second drive unit including a second output member drivingly connected to the second wheel, and a second rotary electric machine, and configured to drive the second wheel; and
a control device configured to control the first drive unit, the second drive unit, and the internal combustion engine, wherein
the first rotary electric machine and the second rotary electric machine are electrically connected to a power storage device so as to transmit and receive electric power to and from the power storage device,
the distribution differential gear mechanism includes a first rotation element drivingly connected to the input member, a second rotation element drivingly connected to the first output member, and a third rotation element drivingly connected to the first rotary electric machine,
the first drive unit has a first mode and a second mode as operation modes, in the first mode, a driving force of the first rotary electric machine is transferred to the first output member while power transfer between the internal combustion engine and the first output member is interrupted,
in the second mode, a reaction force of a driving force transferred from the internal combustion engine to the first rotation element is transferred from the first rotary electric machine to the third rotation element to transfer a driving force of the internal combustion engine to the first output member via the second rotation element, and
the control device is configured to:
in a case where a speed of the vehicle is lower than a predefined first threshold,
when a requested driving force that is a driving force requested in the vehicle is smaller than a predefined second threshold and a charge level of the power storage device is equal to or higher than a predefined third threshold, execute first control for controlling both the first drive unit and the second drive unit to output the requested driving force by setting the operation mode of the first drive unit to the first mode and transferring a driving force of the second rotary electric machine to the second output member; and
when the requested driving force is equal to or larger than the second threshold or the charge level of the power storage device is lower than the third threshold, execute second control for controlling both the first drive unit and the second drive unit to output the requested driving force by setting the operation mode of the first drive unit to the second mode and transferring the driving force of the second rotary electric machine to the second output member.

2. The vehicle drive device according to claim 1, wherein the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
the control device is configured to, when performing mode switching for the operation mode of the first drive unit from the second mode to the third mode, control a driving force of the second drive unit so as to compensate for a fluctuation in a driving force of the first drive unit caused by the mode switching.

3. The vehicle drive device according to claim 2, wherein the first drive unit further includes a transmission disposed in a power transfer path between the distribution differential gear mechanism and the first output member and configured to switch a plurality of shift speeds, and the control device is configured to:

before the transmission performs an operation of switching the shift speeds, reduce a driving force output to the first output member in the first drive unit and increase a driving force output to the second output member in the second drive unit; and after the transmission completes the operation of switching the shift speeds, increase the driving force output to the first output member in the first drive unit and reduce the driving force output to the second output member in the second drive unit.

4. The vehicle drive device according to claim 2, wherein order of rotation speeds of the first rotation element, the second rotation element, and the third rotation element of the distribution differential gear mechanism is the stated order, the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element, in the first mode, the first engagement device is disengaged and the second engagement device is engaged, and in the second mode, the first engagement device is engaged and the second engagement device is disengaged.

5. The vehicle drive device according to claim 2, wherein order of rotation speeds of the first rotation element, the second rotation element, and the third rotation element of the distribution differential gear mechanism is the stated order, the first drive unit further has a third mode as the operation mode, in the third mode, the first rotation element, the second rotation element, and the third rotation element of the distribution differential gear mechanism rotate integrally with each other and the driving force of at least the internal combustion engine is transferred to the first output member, and assuming that a speed of the vehicle at which a rotation speed of the internal combustion engine is a lower limit of an autonomously rotatable speed of the internal combustion engine when the operation mode of the first drive unit is the third mode is a first vehicle speed, the control device is configured to, during execution of the second control, switch the operation mode of the first drive unit from the second mode to the third mode when the speed of the vehicle exceeds the first vehicle speed.

6. The vehicle drive device according to claim 2, wherein order of rotation speeds of the first rotation element, the second rotation element, and the third rotation element of the distribution differential gear mechanism is the stated order, the first drive unit further has a third mode as the operation mode, in the third mode, the first rotation element, the second rotation element, and the third rotation element of the distribution differential gear mechanism rotate integrally with each other and the driving force of at least the internal combustion engine is transferred to the first output member, and assuming that a speed of the vehicle at which a rotation speed of the internal combustion engine is a lower limit of an autonomously rotatable speed of the internal combustion engine when the operation mode of the first drive unit is the third mode is a first vehicle speed, the control device is configured to:

during execution of the second control, in a case where the requested driving force is equal to or larger than a predefined fourth threshold and the charge level is equal to or higher than a predefined fifth threshold or in a case where the requested driving force is smaller than the fourth threshold and the charge level is lower than the fifth threshold, switch the operation mode of the first drive unit from the second mode to the third mode when the speed of the vehicle exceeds the first vehicle speed; and in a case where the requested driving force is equal to or larger than the fourth threshold and the charge level is lower than the fifth threshold, switch the operation mode of the first drive unit from the second mode to the third mode when the speed of the vehicle exceeds a second vehicle speed set to a vehicle speed higher than the first vehicle speed.

7. The vehicle drive device according to claim 2, wherein the first drive unit further has a third mode as the operation mode, in the third mode, the first rotation element, the second rotation element, and the third rotation element of the distribution differential gear mechanism rotate integrally with each other and the driving force of at least the internal combustion engine is transferred to the first output member, the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element, in the third mode, both the first engagement device and the second engagement device are engaged, the first drive unit further includes a transmission disposed in a power transfer path between the distribution differential gear mechanism and the first output member and configured to switch a plurality of shift speeds, and at least one speed ratio of the plurality of shift speeds is smaller than 1.

8. The vehicle drive device according to claim 1, wherein the first drive unit further includes a transmission disposed in a power transfer path between the distribution differential gear mechanism and the first output member and configured to switch a plurality of shift speeds, and the control device is configured to:

before the transmission performs an operation of switching the shift speeds, reduce a driving force output to the first output member in the first drive unit and increase a driving force output to the second output member in the second drive unit; and after the transmission completes the operation of switching the shift speeds, increase the driving force output to the first output member in the first drive unit and reduce the driving force output to the second output member in the second drive unit.

9. The vehicle drive device according to claim 8, wherein
order of rotation speeds of the first rotation element, the second rotation element, and the third rotation element of the distribution differential gear mechanism is the stated order,
the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element,
in the first mode, the first engagement device is disengaged and the second engagement device is engaged, and
in the second mode, the first engagement device is engaged and the second engagement device is disengaged.

10. The vehicle drive device according to claim 8, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to, during execution of the second control, switch the operation mode of the first drive unit from the second mode to the third mode when the speed of the vehicle exceeds the first vehicle speed.

11. The vehicle drive device according to claim 8, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to:
during execution of the second control,
in a case where the requested driving force is equal to or larger than a predefined fourth threshold and the charge level is equal to or higher than a predefined fifth threshold or in a case where the requested driving force is smaller than the fourth threshold and the charge level is lower than the fifth threshold, switch the operation mode of the first drive unit from the second mode to the third mode when the speed of the vehicle exceeds the first vehicle speed; and
in a case where the requested driving force is equal to or larger than the fourth threshold and the charge level is lower than the fifth threshold, switch the operation mode of the first drive unit from the second mode to the third mode when the speed of the vehicle exceeds a second vehicle speed set to a vehicle speed higher than the first vehicle speed.

12. The vehicle drive device according to claim 8, wherein
the first drive unit further includes a transmission disposed in a power transfer path between the distribution differential gear mechanism and the first output member and configured to switch a plurality of shift speeds,
the transmission includes a first shaft member and a second shaft member disposed parallel to each other, a first gear and a second gear disposed on the first shaft member, a third gear disposed on the second shaft member and meshing with the first gear, a fourth gear disposed on the second shaft member and meshing with the second gear, and a third engagement device, and
the third engagement device is an intermeshing engagement device configured to selectively switch a state in which a driving force transferred between the first gear and the third gear is transferred to the second shaft member and a state in which a driving force transferred between the second gear and the fourth gear is transferred to the second shaft member.

13. The vehicle drive device according to claim 8, wherein
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member,
the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element,
in the third mode, both the first engagement device and the second engagement device are engaged,
the first drive unit further includes a transmission disposed in a power transfer path between the distribution differential gear mechanism and the first output member and configured to switch a plurality of shift speeds, and
at least one speed ratio of the plurality of shift speeds is smaller than 1.

14. The vehicle drive device according to claim 1, wherein
order of rotation speeds of the first rotation element, the second rotation element, and the third rotation element of the distribution differential gear mechanism is the stated order,
the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element,
in the first mode, the first engagement device is disengaged and the second engagement device is engaged, and
in the second mode, the first engagement device is engaged and the second engagement device is disengaged.

15. The vehicle drive device according to claim 14, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to, during execution of the second control, switch the operation mode of the first drive unit from the second mode to the third mode when the speed of the vehicle exceeds the first vehicle speed.

16. The vehicle drive device according to claim 14, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to:
during execution of the second control,
in a case where the requested driving force is equal to or larger than a predefined fourth threshold and the charge level is equal to or higher than a predefined fifth threshold or in a case where the requested driving force is smaller than the fourth threshold and the charge level is lower than the fifth threshold, switch the operation mode of the first drive unit from the second mode to the third mode when the speed of the vehicle exceeds the first vehicle speed; and
in a case where the requested driving force is equal to or larger than the fourth threshold and the charge level is lower than the fifth threshold, switch the operation mode of the first drive unit from the second mode to the third mode when the speed of the vehicle exceeds a second vehicle speed set to a vehicle speed higher than the first vehicle speed.

17. The vehicle drive device according to claim 1, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to, during execution of the second control, switch the operation mode of the first drive unit from the second mode to the third mode when the speed of the vehicle exceeds the first vehicle speed.

18. The vehicle drive device according to claim 1, wherein
order of rotation speeds of the first rotation element, the second rotation element, and the third rotation element of the distribution differential gear mechanism is the stated order,
the first drive unit further has a third mode as the operation mode,
in the third mode, the first rotation element, the second rotation element, and the third rotation element of the distribution differential gear mechanism rotate integrally with each other and the driving force of at least the internal combustion engine is transferred to the first output member, and
assuming that a speed of the vehicle at which a rotation speed of the internal combustion engine is a lower limit of an autonomously rotatable speed of the internal combustion engine when the operation mode of the first drive unit is the third mode is a first vehicle speed,
the control device is configured to:
during execution of the second control,
in a case where the requested driving force is equal to or larger than a predefined fourth threshold and the charge level is equal to or higher than a predefined fifth threshold or in a case where the requested driving force is smaller than the fourth threshold and the charge level is lower than the fifth threshold, switch the operation mode of the first drive unit from the second mode to the third mode when the speed of the vehicle exceeds the first vehicle speed; and in a case where the requested driving force is equal to or larger than the fourth threshold and the charge level is lower than the fifth threshold, switch the operation mode of the first drive unit from the second mode to the third mode when the speed of the vehicle exceeds a second vehicle speed set to a vehicle speed higher than the first vehicle speed.

19. The vehicle drive device according to claim 1, wherein the first drive unit further includes a transmission disposed in a power transfer path between the distribution differential gear mechanism and the first output member and configured to switch a plurality of shift speeds, the transmission includes a first shaft member and a second shaft member disposed parallel to each other, a first gear and a second gear disposed on the first shaft member, a third gear disposed on the second shaft member and meshing with the first gear, a fourth gear disposed on the second shaft member and meshing with the second gear, and a third engagement device, and the third engagement device is an intermeshing engagement device configured to selectively switch a state in which a driving force transferred between the first gear and the third gear is transferred to the second shaft member and a state in which a driving force transferred between the second gear and the fourth gear is transferred to the second shaft member.

20. The vehicle drive device according to claim 1, wherein the first drive unit further has a third mode as the operation mode, in the third mode, the first rotation element, the second rotation element, and the third rotation element of the distribution differential gear mechanism rotate integrally with each other and the driving force of at least the internal combustion engine is transferred to the first output member, the first drive unit further includes a first engagement device configured to connect or disconnect power transfer between the input member and the first rotation element, and a second engagement device configured to connect or disconnect power transfer between two elements selected from among three rotation elements that are the first rotation element, the second rotation element, and the third rotation element, in the third mode, both the first engagement device and the second engagement device are engaged, the first drive unit further includes a transmission disposed in a power transfer path between the distribution differential gear mechanism and the first output member and configured to switch a plurality of shift speeds, and at least one speed ratio of the plurality of shift speeds is smaller than 1.

* * * * *